US010674485B2

(12) United States Patent
John Wilson et al.

(10) Patent No.: US 10,674,485 B2
(45) Date of Patent: Jun. 2, 2020

(54) COMMON CONTROL RESOURCE SET WITH USER EQUIPMENT-SPECIFIC RESOURCES

(71) Applicant: QUALCOMM Incorporated, San Diego, CA (US)

(72) Inventors: Makesh Pravin John Wilson, San Diego, CA (US); Tao Luo, San Diego, CA (US); Yang Yang, San Diego, CA (US); Heechoon Lee, San Diego, CA (US); Bilal Sadiq, Basking Ridge, NJ (US); June Namgoong, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/694,143

(22) Filed: Sep. 1, 2017

(65) Prior Publication Data

US 2018/0184410 A1    Jun. 28, 2018

Related U.S. Application Data

(60) Provisional application No. 62/437,966, filed on Dec. 22, 2016.

(51) Int. Cl.
*H04W 72/04* (2009.01)
*H04L 5/00* (2006.01)

(52) U.S. Cl.
CPC ......... *H04W 72/0406* (2013.01); *H04L 5/001* (2013.01); *H04L 5/0048* (2013.01); *H04L 5/0053* (2013.01)

(58) Field of Classification Search
CPC ....... H04L 43/106; H04L 53/04; H04L 43/16; H04L 43/0894; H04L 5/0048; H04L 5/0053; H04W 72/0406; H04W 72/042
See application file for complete search history.

(56) References Cited

U.S. PATENT DOCUMENTS 9,801,175 B2 * 10/2017 Kuchibhotla ......... H04L 5/0007
2011/0085513 A1 * 4/2011 Chen ................... H04W 72/042
370/330

(Continued)

FOREIGN PATENT DOCUMENTS

EP          2582170 A1    4/2013
EP          2876961 A1    5/2015
WO    WO-2015199422 A1   12/2015

OTHER PUBLICATIONS

International Search Report and Written Opinion—PCT/US2017/067698—ISA/EPO—dated Feb. 27, 2018.

(Continued)

*Primary Examiner* — Edan Orgad
*Assistant Examiner* — Nourali Mansoury
(74) *Attorney, Agent, or Firm* — Holland & Hart LLP

(57) ABSTRACT

User equipment (UE)-specific information may be transmitted within a control resource set configured to carry resources common to UEs within a system. The UE-specific information may be associated with a search space having an aggregation level different from aggregation levels used with the common control resources and may occupy different modulation symbols within the common control resource set (e.g., to support flexible scheduling for multiple UEs). A base station and UE may operate in a system using one or more control resource sets within a system bandwidth. The UE may detect common control resources by monitoring decoding candidates in the control resource set according to a first set of aggregation levels. The UE may detect UE-specific control resources by monitoring decoding candidates in the control resource set according to other aggregation levels. The UE and base station may communicate based on control information obtained from the monitoring.

26 Claims, 18 Drawing Sheets

(56) References Cited

U.S. PATENT DOCUMENTS

| | | | | |
|---|---|---|---|---|
| 2014/0068307 | A1* | 3/2014 | Koskinen | H04W 52/0209 713/323 |
| 2014/0233481 | A1* | 8/2014 | Feng | H04L 5/0055 370/329 |
| 2014/0307693 | A1* | 10/2014 | Feng | H04L 27/2602 370/329 |
| 2014/0376457 | A1* | 12/2014 | Feng | H04L 5/001 370/329 |
| 2015/0131565 | A1* | 5/2015 | Nakashima | H04L 1/0026 370/329 |
| 2015/0181568 | A1* | 6/2015 | Seo | H04B 7/0626 370/329 |
| 2015/0304086 | A1* | 10/2015 | Kim | H04B 17/391 370/329 |
| 2016/0227486 | A1* | 8/2016 | Park | H04W 52/146 |
| 2016/0286404 | A1* | 9/2016 | Rico Alvarino | H04L 5/0048 |
| 2017/0164250 | A1* | 6/2017 | Kim | H04W 68/02 |

OTHER PUBLICATIONS

Ericsson: "On Downlink Control Signaling Structure", 3GPP Draft; R1-1612913, on Downlink Control Signaling Structure, 3rd Generation Partnership Project (3GPP), Mobile Competence Centre, 650 Route Des Lucioles, F-06921, Sophia-Antipolis Cedex; France, vol. RAN WG1, No. Reno, NV, USA, Nov. 14, 2016-Nov. 18, 2016, Nov. 13, 2016 (Nov. 13, 2016), XP051176854, Retrieved from the Internet: URL:http://www.3gpp.org/ftp/Meetings_3GPP_SYNC/RAN1/Docs/, 2 pages, [retrieved on Nov. 13, 2016].

Ericsson: "Summary of e-mail Discussions on Downlink Control Signaling", 3GPP Draft; R1-1612908, Summary of e-Mail Discussion on Downlink Control Siganling, 3rd Generation Partnership Project (3GPP), Mobile Competence Centre, 650 Route Des Lucioles, F-06921, Sophia-Antipo, vol. RAN WG1, No. Reno, NV, USA, Nov. 14, 2016-Nov. 18, 2016, Nov. 13, 2016 (Nov. 13, 2016), XP051190931, Retrieved from the Internet: URL:http://www.3gpp.org/ftp/tsg_ran/WG1_RL 1/TSGR1_87/Docs1, 37 pages, [retrieved on Nov. 13, 2016].

Huawei et al., "Search Space Design Aspects", 3GPP Draft; R1-1701640, vol. RAN WG1, No. Athens, Greece; 20170213-20170217, Feb. 6, 2017 (Feb. 6, 2017), XP051220523, 5 Pages, Retrieved from the Internet: URL:http://www.3gpp.org/ftp/tsg_ran/WG1_RL1/TSGR1_88/Docs/ [retrieved on Feb. 6, 2017].

LG Electronic: "Discussion on CSS and USS in NR System", 3GPP TSG RAN WG1 Meeting #87, 3GPP Draft; R1—1611837, Reno, USA, Nov. 14-18, 2016, 5 Pages.

* cited by examiner

COMMON CONTROL RESOURCE SET WITH USER EQUIPMENT-SPECIFIC RESOURCES

CROSS REFERENCES

The present application for patent claims priority to U.S. Provisional Patent Application No. 62/437,966 by JOHN WILSON, et al., entitled "COMMON CONTROL RESOURCE SET WITH USER EQUIPMENT-SPECIFIC RESOURCES," filed Dec. 22, 2016, assigned to the assignee hereof.

BACKGROUND

The following relates generally to wireless communication and more specifically to a common control resource set that includes user equipment-specific resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, control information may be transmitted in certain control resource sets of a system bandwidth (e.g., to limit the bandwidth over which a wireless device searches for control information). For example, a control resource set may include one or more search spaces (e.g., a common search space and/or UE-specific search space) for the transmission of common and UE-specific control information, respectively. That is, in some cases a common search space and a UE-specific search space may be included in a same control resource set. However, common control resource sets may be configured with limitations on aggregation levels that limit flexibility within the system to transmit UE-specific information.

SUMMARY

The described techniques relate to improved methods, systems, devices, or apparatuses that support common control resource set design. Generally, the described techniques provide for transmission of UE-specific information within a common control resource set. That is, UE-specific information may be transmitted within a common control resource set otherwise configured to carry resources common to UEs within a system. The UE-specific information may be associated with a search space having an aggregation level different from aggregation levels used for a common search space and/or may occupy different modulation symbols within the control resource set (e.g., to support flexible scheduling for multiple UEs). A base station and UE may communicate in a system using one or more control resource sets within a system bandwidth. The UE may detect common control resources by monitoring decoding candidates in a given control resource set according to a first set of aggregation levels. The UE may detect UE-specific control resources by monitoring decoding candidates in the control resource set according to other aggregation levels. The UE and base station may communicate based on control information obtained from the monitoring.

A method of wireless communication is described. The method may include identifying one or more control resource sets in a system bandwidth, identifying, for a control resource set in the one or more control resource sets, a first aggregation level associated with a first search space and a second aggregation level associated with a second search space, monitoring at least one first decoding candidate of the first search space in accordance with the first aggregation level to detect common control information, monitoring at least one second decoding candidate of the second search space in accordance with the second aggregation level to detect UE-specific control information, and communicating based at least in part on the common control information, the UE-specific control information, or both.

An apparatus for wireless communication is described. The apparatus may include means for identifying one or more control resource sets in a system bandwidth, means for identifying, for a control resource set in the one or more control resource sets, a first aggregation level associated with a first search space and a second aggregation level associated with a second search space, means for monitoring at least one first decoding candidate of the first search space in accordance with the first aggregation level to detect common control information, means for monitoring at least one second decoding candidate of the second search space in accordance with the second aggregation level to detect UE-specific control information, and means for communicating based at least in part on the common control information, the UE-specific control information, or both.

Another apparatus for wireless communication is described. The apparatus may include a processor, memory in electronic communication with the processor, and instructions stored in the memory. The instructions may be operable to cause the processor to identify one or more control resource sets in a system bandwidth, identify, for a control resource set in the one or more control resource sets, a first aggregation level associated with a first search space and a second aggregation level associated with a second search space, monitor at least one first decoding candidate of the first search space in accordance with the first aggregation level to detect common control information, monitor at least one second decoding candidate of the second search space in accordance with the second aggregation level to detect UE-specific control information, and communicate based at least in part on the common control information, the UE-specific control information, or both.

A non-transitory computer readable medium for wireless communication is described. The non-transitory computer-readable medium may include instructions operable to cause a processor to identify one or more control resource sets in a system bandwidth, identify, for a control resource set in the one or more control resource sets, a first aggregation level associated with a first search space and a second aggregation level associated with a second search space, monitor at least one first decoding candidate of the first search space in accordance with the first aggregation level to detect common control information, monitor at least one second decoding candidate of the second search space in accordance with the second aggregation level to detect UE-specific control information, and communicate based at least in part on the common control information, the UE-specific control information, or both.

Some examples of the method, apparatus, and non-transitory computer-readable medium described above may further include processes, features, means, or instructions for identifying two or more modulation symbols within the control resource set, wherein a first modulation symbol of the control resource set comprises the first search space and a second modulation symbol of the control resource set comprises the second search space.

Some examples of the method, apparatus, and non-transitory computer-readable medium described above may further include processes, features, means, or instructions for receiving a reference signal in a modulation symbol of the control resource set, wherein the control resource set comprises a broadcast channel punctured by the reference signal.

In some examples of the method, apparatus, and non-transitory computer-readable medium described above, frequency resources of the first search space overlap at least partially with frequency resources of the second search space. Some examples of the method, apparatus, and non-transitory computer-readable medium described above may further include processes, features, means, or instructions for receiving a reference signal in the overlapping frequency resources. Some examples of the method, apparatus, and non-transitory computer-readable medium described above may further include processes, features, means, or instructions for detecting at least one of the common control information or the UE-specific control information in the overlapping frequency resources based at least in part on the reference signal.

Some examples of the method, apparatus, and non-transitory computer-readable medium described above may further include processes, features, means, or instructions for receiving a message that configures a plurality of component carriers in a carrier aggregation configuration, wherein the system bandwidth comprises a bandwidth of a first component carrier of the carrier aggregation configuration. Some examples of the method, apparatus, and non-transitory computer-readable medium described above may further include processes, features, means, or instructions for receiving a master information block (MIB), wherein the MIB comprises an indication of a location of the control resource set. Some examples of the method, apparatus, and non-transitory computer-readable medium described above may further include processes, features, means, or instructions for identifying the location of the control resource set based at least in part on the received MIB.

In some examples of the method, apparatus, and non-transitory computer-readable medium described above, the system bandwidth further comprises a second component carrier of the carrier aggregation configuration. In some examples of the method, apparatus, and non-transitory computer-readable medium described above, the MIB may be received on the second component carrier. In some examples of the method, apparatus, and non-transitory computer-readable medium described above, the location of the control resource set may be identified in the first component carrier of the carrier aggregation configuration.

In some examples of the method, apparatus, and non-transitory computer-readable medium described above, the MIB may be received on the first component carrier and may indicate that none of the one or more control resource sets may be present in the first component carrier.

In some examples of the method, apparatus, and non-transitory computer-readable medium described above, the control resource set may be associated with control information common to the UE and other UEs operating in the system bandwidth.

In some examples of the method, apparatus, and non-transitory computer-readable medium described above, the first aggregation level may be from a first set of aggregation levels comprising aggregation level four or aggregation level eight, or both.

In some examples of the method, apparatus, and non-transitory computer-readable medium described above, the second aggregation level may be from a second set of aggregation levels comprising aggregation level one, aggregation level two, aggregation level four, aggregation level eight, or aggregation level sixteen, or any combination thereof.

In some examples of the method, apparatus, and non-transitory computer-readable medium described above, the control resource set comprises at least one of system information, paging information, a random access response message, group power control, addressing to a plurality of UEs, or any combination thereof.

A method of wireless communication is described. The method may include identifying one or more control resource sets in a system bandwidth, identifying, for a control resource set in the one or more control resource sets, a first aggregation level associated with a first search space and a second aggregation level associated with a second search space, mapping common control information to at least one first decoding candidate of the first search space in accordance with the first aggregation level, mapping user equipment (UE)-specific control information to at least one second decoding candidate of the second search space in accordance with the second aggregation level, and communicating with a UE based at least in part on the common control information, the UE-specific control information, or both.

An apparatus for wireless communication is described. The apparatus may include means for identifying one or more control resource sets in a system bandwidth, means for identifying, for a control resource set in the one or more control resource sets, a first aggregation level associated with a first search space and a second aggregation level associated with a second search space, means for mapping common control information to at least one first decoding candidate of the first search space in accordance with the first aggregation level, means for mapping user equipment (UE)-specific control information to at least one second decoding candidate of the second search space in accordance with the second aggregation level, and means for communicating with a UE based at least in part on the common control information, the UE-specific control information, or both.

Another apparatus for wireless communication is described. The apparatus may include a processor, memory in electronic communication with the processor, and instructions stored in the memory. The instructions may be operable to cause the processor to identify one or more control resource sets in a system bandwidth, identify, for a control resource set in the one or more control resource sets, a first aggregation level associated with a first search space and a second aggregation level associated with a second search space, map common control information to at least one first decoding candidate of the first search space in accordance with the first aggregation level, map user equipment (UE)-specific control information to at least one second decoding candidate of the second search space in accordance with the second aggregation level, and communicate with a UE based at least in part on the common control information, the UE-specific control information, or both.

A non-transitory computer readable medium for wireless communication is described. The non-transitory computer-readable medium may include instructions operable to cause a processor to identify one or more control resource sets in a system bandwidth, identify, for a control resource set in the one or more control resource sets, a first aggregation level associated with a first search space and a second aggregation level associated with a second search space, map common control information to at least one first decoding candidate of the first search space in accordance with the first aggregation level, map user equipment (UE)-specific control information to at least one second decoding candidate of the second search space in accordance with the second aggregation level, and communicate with a UE based at least in part on the common control information, the UE-specific control information, or both.

Some examples of the method, apparatus, and non-transitory computer-readable medium described above may further include processes, features, means, or instructions for configuring two or more modulation symbols within the control resource set, wherein a first modulation symbol of the control resource set comprises the first search space and a second modulation symbol of the control resource set comprises the second search space.

Some examples of the method, apparatus, and non-transitory computer-readable medium described above may further include processes, features, means, or instructions for transmitting a reference signal in a modulation symbol of the control resource set, wherein the control resource set comprises a broadcast channel punctured by the reference signal.

In some examples of the method, apparatus, and non-transitory computer-readable medium described above, frequency resources of the first search space overlap at least partially with frequency resources of the second search space. Some examples of the method, apparatus, and non-transitory computer-readable medium described above may further include processes, features, means, or instructions for transmitting a reference signal in the overlapping frequency resources. Some examples of the method, apparatus, and non-transitory computer-readable medium described above may further include processes, features, means, or instructions for mapping control information in the overlapping frequency resources based at least in part on the reference signal.

Some examples of the method, apparatus, and non-transitory computer-readable medium described above may further include processes, features, means, or instructions for transmitting a message that configures a plurality of component carriers in a carrier aggregation configuration, wherein the system bandwidth comprises a bandwidth of a first component carrier of the carrier aggregation configuration. Some examples of the method, apparatus, and non-transitory computer-readable medium described above may further include processes, features, means, or instructions for transmitting a MIB, wherein the MIB comprises an indication of a location of the control resource set.

In some examples of the method, apparatus, and non-transitory computer-readable medium described above, the control resource set may be associated with control information common to the UE and other UEs operating in the system bandwidth.

In some examples of the method, apparatus, and non-transitory computer-readable medium described above, the first aggregation level may be from a first set of aggregation levels comprising aggregation level four or aggregation level eight, or both.

In some examples of the method, apparatus, and non-transitory computer-readable medium described above, the second aggregation level may be from a second set of aggregation levels comprising aggregation level one, aggregation level two, aggregation level four, aggregation level eight, or aggregation level sixteen, or any combination thereof.

In some examples of the method, apparatus, and non-transitory computer-readable medium described above, the common control resource set comprises at least one of system information, paging information, a random access response message, group power control, addressing to a plurality of UEs, or any combination thereof.

DETAILED DESCRIPTION

Figure 1:
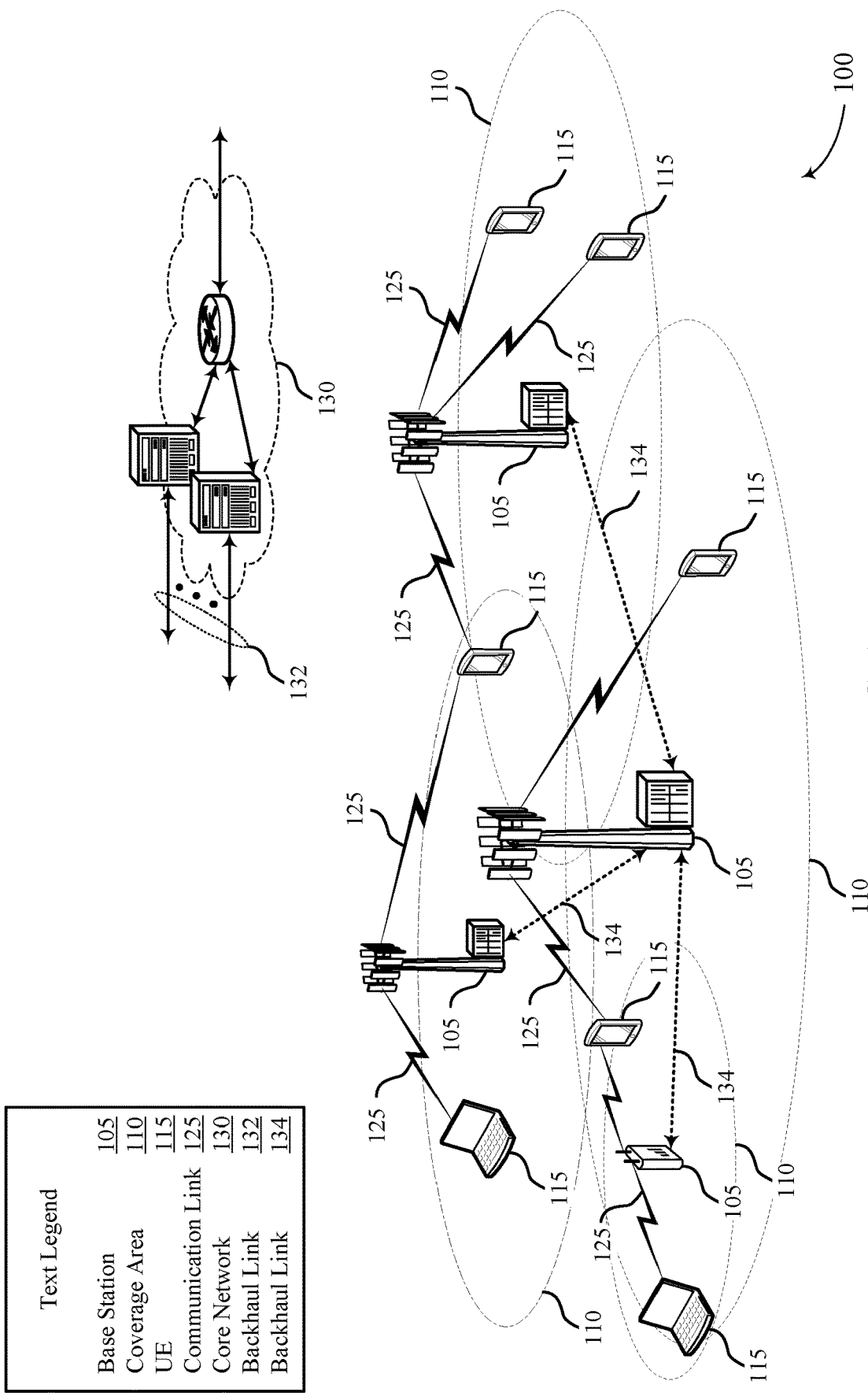
FIG. 1 illustrates an example of a system for wireless communication that supports a common control resource set with UE-specific resources in accordance with aspects of the present disclosure.

Some wireless communications systems may use control resource sets within a system bandwidth to transmit control information to UEs. In some examples, control information may not span the full system bandwidth and may instead be transmitted in certain control resource sets that include common or UE-specific control information. A UE within the system may accordingly monitor decoding candidates of a common search space for control information intended for multiple UEs as well as decoding candidates of a UE-specific search space for control information designated for the UE. As described herein, a base station may map UE-specific control information to a control resource set otherwise associated with common control information (i.e., a common control resource set). Such mapping may improve scheduling flexibility over systems that employ separate common and UE-specific control resource sets.

A common control resource set may be used to carry broadcast information (e.g., system information, paging information, random access responses, etc.), and a common search space within the common control resource set may be associated with a certain set of aggregation levels, including, for example, aggregation level four and aggregation level eight. In some cases, UE-specific information may also be transmitted in the common control resource set, but the number of UEs multiplexed on resources of the common control resource set may be limited by a lack of more aggregation level choices (e.g., as aggregation level four or aggregation level eight may be the only options). As described herein, however, a resource-efficient design for the control resource set may be used, enabling greater flexibility when transmitting UE-specific control information on the common control resource set, when multiplexing with synchronization signals, and when using in carrier aggregation configurations.

For example, the resources in a control resource set may include different decoding candidates for obtaining control information, where the decoding candidates may be associated with broadcast-based or UE-specific control channels (e.g., may belong to a common search space or a UE-specific search space, respectively). For example, a first candidate set of resources may correspond to a broadcast-based control channel, which may be defined by a search space having a certain set of aggregation levels (e.g., including aggregation level 4 and aggregation level 8). A second candidate set of resources for UE-specific control information may correspond to a UE-specific control channel, and may be defined by a search space with another set of aggregation levels (e.g., aggregation levels 1, 2, 4, 8, and 16). Because the second candidate set of resources may have a search space providing greater flexibility in aggregation levels than the first candidate set of resources, a base station may transmit UE-specific information to a larger number of UEs using the common control resources than would be possible using only the first set of aggregation levels.

Aspects of the disclosure introduced above are described below in the context of a wireless communications system. Further examples are then provided of a common control resource configuration that includes a UE-specific search space. Aspects of the disclosure are further illustrated by and described with reference to apparatus diagrams, system diagrams, and flowcharts that relate to common control resource set design.

FIG. 1 illustrates an example of a wireless communications system 100 in accordance with various aspects of the present disclosure. Wireless communications system 100 includes base stations 105, UEs 115, and a core network 130. In some examples, the wireless communications system 100 may be a Long Term Evolution (LTE) (or LTE-Advanced (LTE-A)) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support an efficient use of resources within a common control resource set that enables the transmission of UE-specific control information to multiple UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. UEs 115 may identify control resource sets of a system bandwidth, and they may identify and communicate based on different aggregation levels associated with common and UE-specific control resources within the same control resource set.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may identify control resource sets of a system bandwidth, and they may identify and communicate based on different aggregation levels associated with common and UE-specific control resources within the same control resource set.

A base station 105 may be connected by an S1 interface to the core network 130. The core network may be an evolved packet core (EPC), which may include at least one mobility management entity (MME), at least one serving gateway (S-GW), and at least one packet data network (PDN) gateway P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently).

Wireless communications system 100 may support operation on multiple cells or carriers, a feature which may be referred to as carrier aggregation or multi-carrier operation. A carrier may also be referred to as a component carrier, a layer, a channel, a bandwidth part, etc. The term "component carrier" may refer to each of the multiple carriers utilized by a UE 115 in carrier aggregation operation, and may be distinct from other portions of system bandwidth. A component carrier may be a relatively narrow-bandwidth carrier susceptible of being utilized independently or in combination with other component carriers. A component carrier may include several subbands, which in turn may comprise several subcarriers. Component carriers may be configured with various control resource sets as described herein.

Each component carrier may provide the same capabilities as an isolated carrier based on release 8 or release 9, or subsequent releases, of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9) while other UEs 115 (e.g., UEs 115 implementing post-release 8/9 LTE versions), may be configured with multiple component carriers in a multi-carrier mode.

A carrier used for downlink may be referred to as a downlink component carrier, and a carrier used for uplink may be referred to as an uplink component carrier. A UE 115 may be configured with multiple downlink component carriers and one or more uplink component carriers for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers.

Each cell of a base station 105 may include an uplink component carrier and a downlink component carrier. The coverage area 110 of each serving cell for a base station 105 may be different (e.g., component carriers on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgment/negative acknowledgment (ACK/NACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

Wireless communications system 100 may be a packet-based network that operates according to a layered protocol stack. In the user plane, communications at the bearer or Packet Data Convergence Protocol (PDCP) layer may be Internet Protocol (IP)-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a network device, or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization and may provide a cell identity value, which may be combined with the physical layer identity value to identify the cell. The SSS may also enable detection of a duplexing mode and a cyclic prefix length. Some systems, such as TDD systems, may transmit a SSS but not a PSS. Both the PSS and the SSS may be located in the central 62 and 72 subcarriers of a carrier, respectively.

After receiving the PSS and SSS, the UE 115 may receive a MIB, which may be transmitted in a physical broadcast channel (PBCH). The MIB may be transmitted in a central portion (e.g., a central subband) of a component carrier. The MIB may contain system bandwidth information, a SFN, and a physical HARQ indicator channel (PHICH) configuration. The MIB may contain an indication of a location of a control resource set. After decoding the MIB, the UE 115 may receive one or more system information blocks (SIBs), which may carry the remaining minimum system information. For example, SIB1 may contain cell access parameters and scheduling information for other SIBs. Decoding SIB1 may enable the UE 115 to receive SIB2. SIB2 may contain RRC configuration information related to random access channel (RACH) procedures, paging, PUCCH, physical uplink shared channel (PUSCH), power control, sounding reference signal (SRS), and cell barring. The UE 115 may also determine that a component carrier excludes a control resource set (e.g., based on the MIB), or the UE 115 may identify the control resource set based on the indication in the MIB or based on an indication in a SIB.

A physical downlink control channel (PDCCH) carries downlink control information (DCI) in control channel elements (CCEs), which may consist of nine logically contiguous resource element groups (REGs), where each REG contains four resource elements (REs). DCI includes information regarding DL scheduling assignments, UL resource grants, transmission scheme, UL power control, HARQ information, modulation and coding scheme (MCS), etc. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI may include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. Certain DCI messages may include common control information. For example, each UE 115 may be assigned a cell radio network temporary identifier (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in aggregation levels of 1, 2, 4, 8 or 16 CCEs), and a set of CCE locations in which the user equipment may find relevant DCI may be specified. The set of CCEs may be known as a search space. A control resource set can be partitioned into two regions: a common CCE region or search space and a UE-specific (i.e., dedicated) CCE region or search space.

The common search space (i.e., the common CCE region) may be monitored by all UEs 115 served by a base station 105 and may include information such as paging information, system information, random access procedures, and the like. As described herein, a common search space and a UE-specific search space may be included in a given control resource set. In some examples, a common search space may be mapped to a first symbol of the control resource set and a UE-specific search space may be mapped to another symbol. The UE-specific search space may include user-specific control information. CCEs may be indexed, and the common search space may start from CCE 0. The starting index for a UE-specific search space may depend on the C-RNTI, the subframe index, the CCE aggregation level, and a random seed. In some cases, the UE-specific search space and the common search space may share one or more CCEs (e.g., CCE 8).

A UE 115 may attempt to decode DCI by performing a process known as a blind decode, during which search spaces are randomly decoded until the DCI is detected. During a blind decode, the UE 115 may attempt to descramble all potential DCI messages using its C-RNTI, and perform a CRC check to determine whether the attempt for a given decoding candidate was successful.

A resource element, which may include common or UE-specific control information or data may consist of one symbol period and one subcarrier (e.g., a 15 kHz frequency range). A resource block may contain 12 consecutive subcarriers in the frequency domain and, for a normal cyclic prefix in each OFDM symbol, 7 consecutive orthogonal frequency division multiplexed (OFDM) symbols in the time domain (1 slot), or 84 resource elements. The number of bits carried by each resource element may depend on the MCS. Thus, the more resource blocks that a UE receives and the higher the modulation scheme, the higher the data rate may be.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other component carriers, which may include use of a reduced symbol duration as compared with symbol durations of the other component carriers. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communications system 100 may enable transmission of UE-specific information within a control resource set, where the UE-specific information is associated with a search space having an aggregation level that enables flexible scheduling for multiple UEs 115. The UE 115 may identify different aggregation levels for a control resource set, where the control resource set is configured to carry control information used by multiple UEs 115. In some cases, the UE 115 may monitor different decoding candidates in the control resource set according to the different aggregation levels. For instance, the UE 115 may detect resources of the control resource set by monitoring decoding candidates according to an aggregation level. Additionally, the UE 115 may detect UE-specific control resources by monitoring decoding candidates in the control resource set according to another aggregation level. Based on control information within the control resource set, the UE-specific resources, or both, the UE 115 and base station 105 may communicate with each other.

Figure 2:
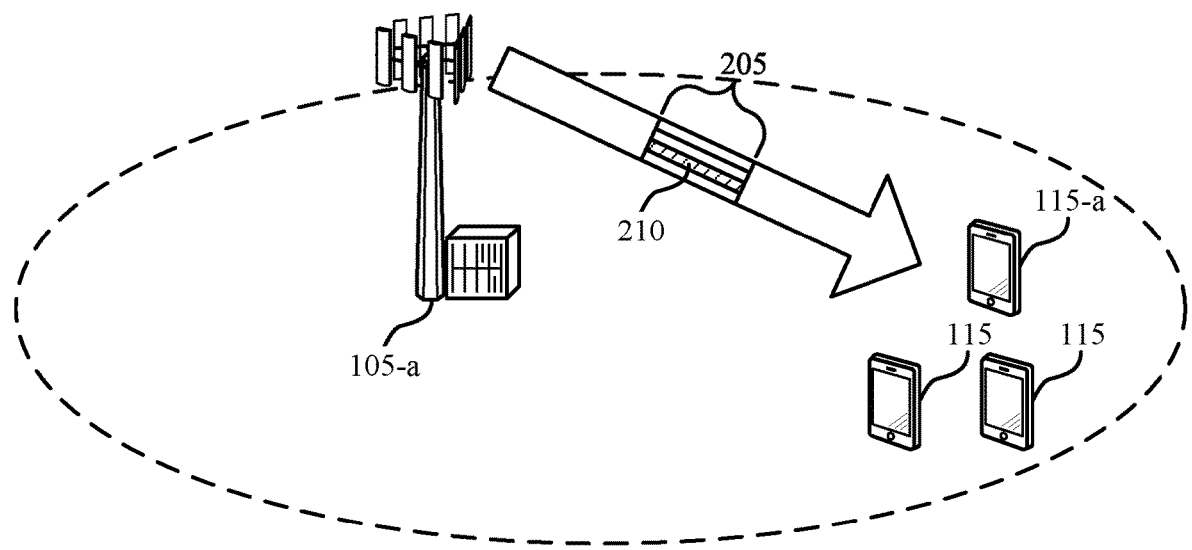
FIG. 2 illustrates an example of a wireless communications system that supports communication using a common control resource set with UE-specific resources in accordance with aspects of the present disclosure.

FIG. 2 illustrates an example of a wireless communications system 200 that supports communications using a common control resource set design. Wireless communications system 200 may include a base station 105-a and multiple UEs 115 (e.g., including a UE 115-a), which may be examples of the respective devices as described with reference to FIG. 1. Wireless communications system 200 may be an example of a system that enables the transmission of UE-specific information within a common control resource set using different aggregations levels for a search space associated with the UE-specific information.

Wireless communications system 200 may employ a set of subbands 205 within a system bandwidth to transmit control information to the multiple UEs 115. For instance, control information may not span the full system bandwidth and may instead be transmitted in certain subbands 205 that include common or UE-specific control information. As an example, a system bandwidth of 100 MHz may include subbands 205 including a common control resource set (e.g., associated with a first 20 MHz bandwidth) in addition to different subbands 205 including a UE-specific control resource set (e.g., associated with a second 20 MHz bandwidth). That is, the common control resource set and the UE-specific control resource set may each span one or more subbands 205 (e.g., such that the control resource sets may not comprise contiguous frequency resources). UE 115-a may accordingly monitor the common control resource set for control information intended for the multiple UEs 115, as well as the UE-specific control resource set for control information intended for UE 115-a.

The common control resource set may be used to carry broadcast information, such as system information, paging information, random access responses, etc. A search space within the common control resource set may be associated with a certain set of aggregation levels, including, for example, aggregation level 4 and aggregation level 8. In some cases, UE-specific information may also be transmitted in the common control resource set. In some cases, wireless communications system 200 may use a resource efficient design for the common control resource set, enabling greater flexibility when transmitting UE-specific control information on the common control resource set, when multiplexing with synchronization signals and broadcast channels, and when using in carrier aggregation configurations.

In some cases, the resources within a control resource set 210 of the one or more subbands 205 may include different decoding candidates for control information, where the decoding candidates may be associated with broadcast-based or UE-specific control channels (e.g., having a common search space or a UE-specific search space). For example, a first candidate set of resources in the control resource set 210 may correspond to a broadcast-based control channel, which may be defined by a search space having a first set of aggregation levels (e.g., including aggregation level four and aggregation level eight). The broadcast-based control channel may have control information including system information, paging, random access response, group power control, or addressing for the multiple UEs 115.

A second candidate set of resources in the control resource set 210 set may correspond to a UE-specific control channel and may be defined by a search space associated with another set of aggregation levels. That is, the UE-specific candidate resource set may be defined, for example, to include a search space that has aggregation levels 1, 2, 4, 8, or 16. Because the second candidate set of resources may include a search space having more flexibility with aggregation levels used, including, for example, smaller aggregation levels compared to the first candidate set (such as aggregation level 1 and aggregation level 2), base station 105-a may transmit UE-specific information for UE 115-a and UE-specific information for other UEs 115 using resources in the control resource set 210. That is, due to the smaller aggregation levels, more UEs 115 may be multiplexed on the common control resource set when UE-specific information is sent.

In some examples, the common control resource set within the control resource set 210 may be configured to include multiple symbol periods (e.g., modulation symbols) for control information. In such cases, a first candidate set of resources (e.g., including broadcast-based control information) may be restricted to certain modulation symbols. For instance, a first symbol period (e.g., a temporally first symbol period) may be allowed to carry broadcast-based control information. Additionally or alternatively, any UE-specific control information in the first symbol period may include the same control candidate set as the broadcast-based control information. A second symbol period (e.g., subsequent to the first symbol period) may include the UE-specific search space including the UE-specific control information.

In some cases (e.g., when there is overlap between resources of the UE-specific candidate set and the common control candidate set), it may be beneficial to use a single reference signal (e.g., demodulation reference signal (DMRS)) for a given CCE of the overlapping candidate sets. For example, the reference signal may be transmitted over the control resource set 210, but may be used to provide channel estimates for CCEs associated with decoding candidates of the common search space as well as CCEs associated with decoding candidates of the UE-specific search space covered by the reference signal.

In some cases, the control resource set 210 may include a reference signal and may be located in the same slot, or aggregated slot (e.g., in carrier aggregation configurations), with a downlink synchronization signal (e.g., a PSS, SSS, etc.) or broadcast channel (e.g., PBCH). In some cases, the downlink synchronization signal may overlap with resources of control resource set 210. The reference signal may thus puncture into the synchronization signal when the reference signal and synchronization signal occupy the same symbol period. For instance, a PBCH may occupy the temporally first symbol period in a slot, and the temporally first symbol may also contain the reference signal for the control resource set 210. The reference signal may thus puncture the PBCH.

The presence and the location of various control resource sets sent using carrier aggregation techniques may be indicated using an MIB. For example, the MIB may be used to indicate that the component carrier carrying the MIB does not contain a control resource set. The MIB may also indicate the transmission of control resource sets on a different component carrier (e.g., cross-carrier signaling).

Figure 3:
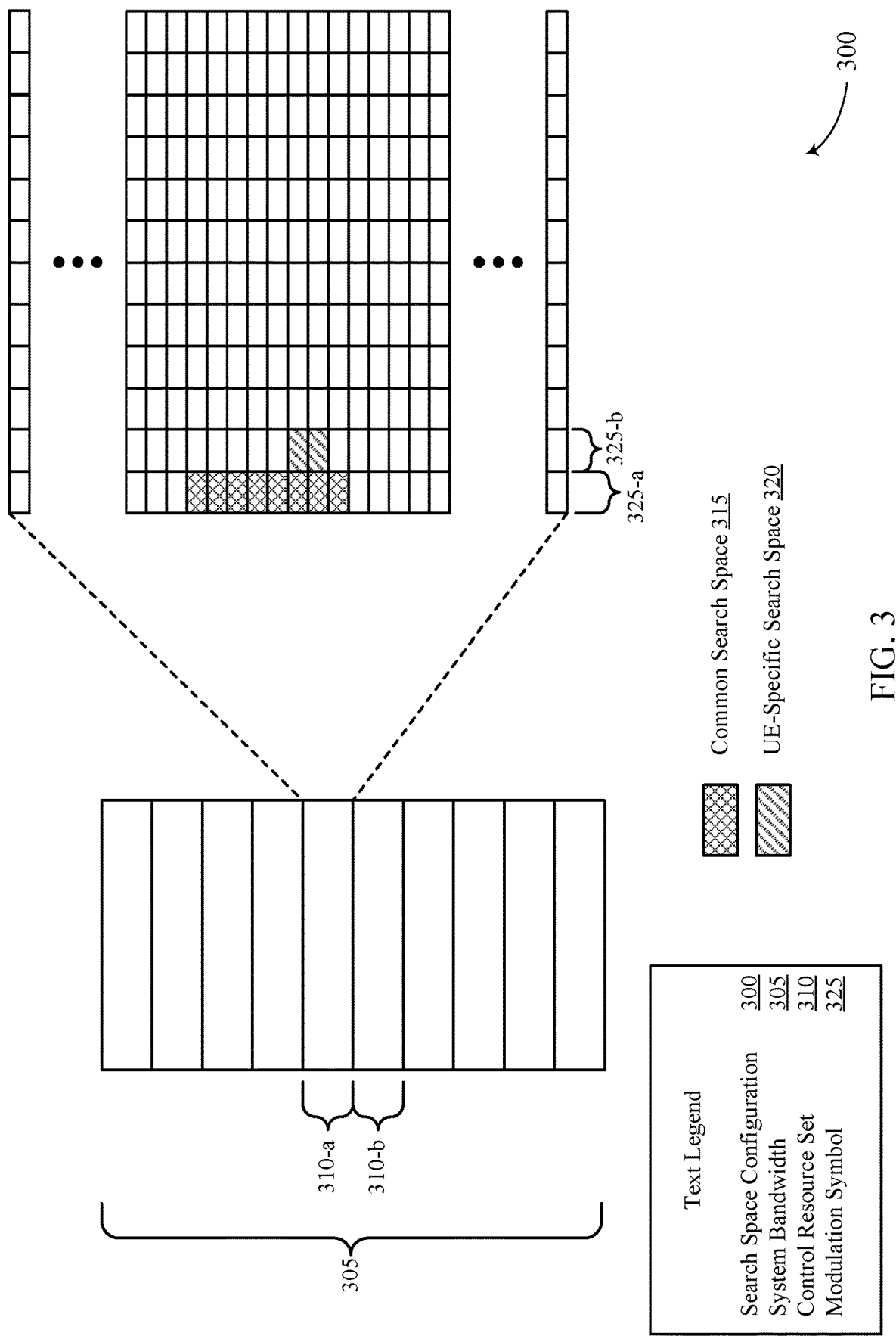
FIG. 3 illustrates an example of a search space configuration for a common control resource set with UE-specific resources in accordance with aspects of the present disclosure.

FIG. 3 illustrates an example of a search space configuration 300 for a common control resource set design. In some examples, search space configuration 300 may be used by a base station 105 to map a common control decoding candidate, or UE-specific decoding candidate, or both, to different resources within a control resource set using different aggregation levels. Search space configuration 300 may be an example of a common control resource set design that enables an efficient use of resources for the transmission of UE-specific information.

Search space configuration 300 may include a system bandwidth 305 that includes multiple control resource sets 310. Although illustrated as being adjacent in frequency, it is to be understood that in some cases, control resource sets 310 may be discontiguous (i.e., non-adjacent in frequency) or may overlap at least partially. In some cases, a first control resource set 310-a may be configured for transmission of control information that is common to several UEs 115 (e.g., system information, paging information, etc.), and a second control resource set 310-b may be configured for the transmission of UE-specific control information (e.g., scheduling information, power control information, etc.). As a result, UEs 115 operating in the system bandwidth 305 may not need to monitor the full system bandwidth 305 to acquire DCI. Instead, the UEs 115 may monitor resources of the first control resource set 310-a and the second control resource set 310-b for DCI and may then open their radio frequency to the full system bandwidth 305 as needed (e.g., to send or receive data).

As discussed above, the first control resource set 310-a may include a common search space that is associated with different aggregation levels. The first control resource set 310-a may include a common search space 315 having a first aggregation level and a UE-specific search space 320 having a second aggregation level. For instance, common search space 315 may be associated with aggregation level eight, and may correspond to a broadcast-based transmission of control information for multiple UEs 115. Additionally, UE-specific search space 320 may correspond to aggregation level two and include UE-specific information for a particular UE 115.

Different aggregation levels for the common search space 315 and UE-specific search space 320 may be possible. For instance, common search space 315 may be associated with aggregation level four, and UE-specific search space 320 may be associated with aggregation level sixteen. In any event, the first control resource set 310-a may include different control candidate sets that a UE 115 may monitor for decoding of control information. In some cases, the different control candidate sets may just be two different candidate sets having different aggregation levels.

In some examples, control information in the common control resources included in first control resource set 310-a set may include control information over multiple modulation symbols 325 (e.g., OFDM symbols). In such cases, the common search space 315 may be included in a first modulation symbol 325-a while the UE-specific search space 320 may be included in a second modulation symbol 325-b. Accordingly, the different modulation symbols 325 may be associated with control information in different search spaces having respective aggregation levels. A UE 115 may monitor both first modulation symbol 325-a and second modulation symbol 325-b (or more modulation symbols 325) within the first control resource set 310-a for decoding candidates. As a result of any control information detected within the common search space 315 and/or the UE-specific search space 320, a UE 115 may communicate with a base station 105.

In some cases, at least a portion of common search space 315 may overlap with a portion (e.g., or all) of UE-specific search space 320. As described above, in such cases a reference signal transmitted within common search space 315 (e.g., or UE-specific search space 320) may be used to obtain a channel estimate for decoding candidates of each search space. For example, a reference signal carried in common search space 315 in first modulation symbol 325-a may facilitate detection of control information in UE-specific search space 320 in second modulation symbol 325-b. Further, although aspects of the present example are described in the context of frequency-first scheduling (i.e., scheduling in which a transmission is scheduled across available frequency resources before being scheduled across different time resources), it is to be understood that various aspects extend to time-first scheduling as well. For example, in some cases, common search space 315 may span symbol periods 325-a, 325-b (e.g., over a first set of frequency resources) and UE-specific search space 315 may span one or both of symbol periods 325-a, 325-b (e.g., over a second set of frequency resources, which may overlap completely, partially, or not at all with the first set of frequency resources).

Figure 4:
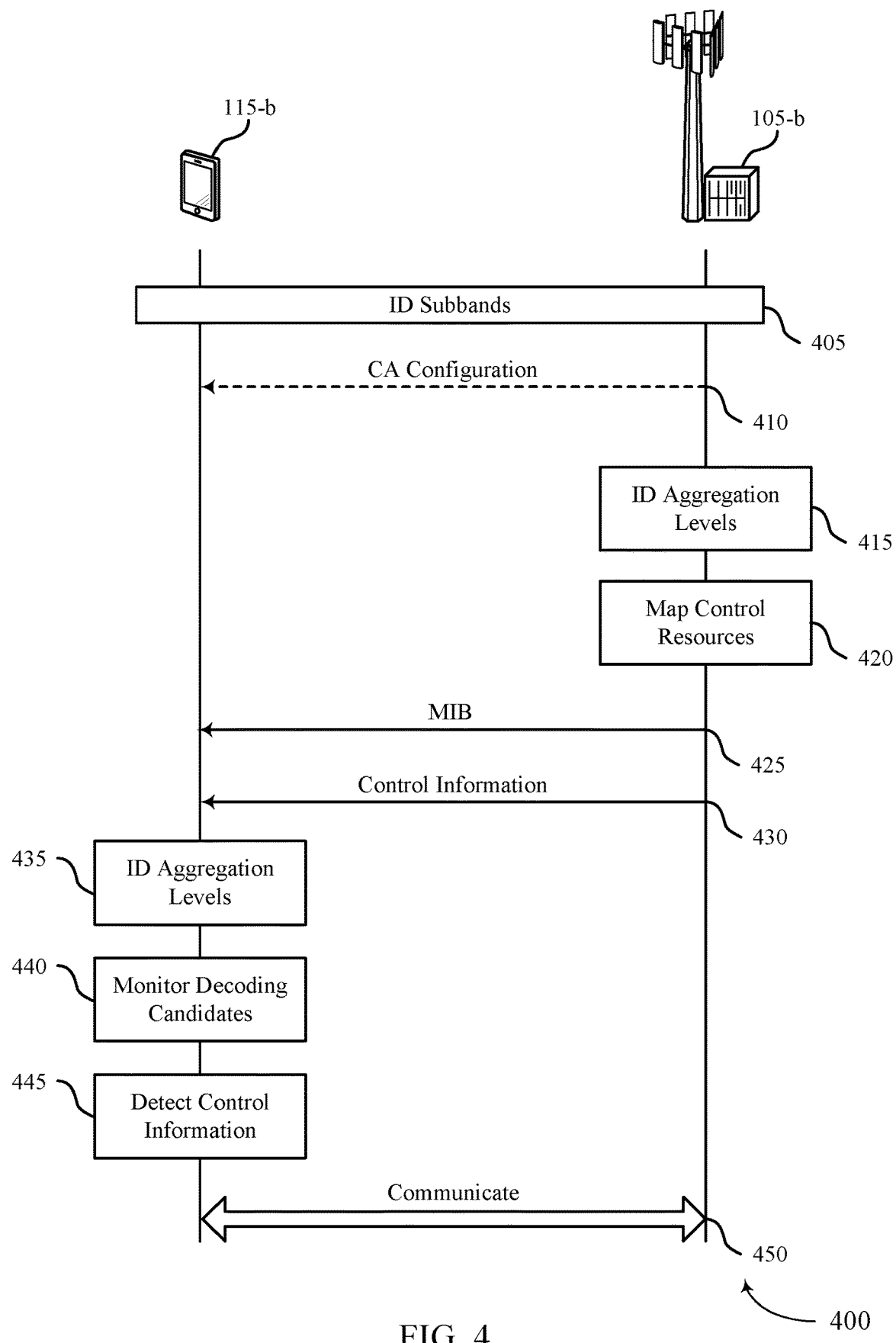
FIG. 4 illustrates an example of a process flow in a system that supports communications using a common control resource set with UE-specific resources in accordance with aspects of the present disclosure.

FIG. 4 illustrates an example of a process flow 400 in a system that supports communications using a common control resource set with UE-specific resources. Process flow 400 may include a UE 115-b and base station 105-b, which may be examples of the corresponding devices as described with reference to FIGS. 1 and 2. Process flow 400 may be an example of a system in which a common control resource set may include UE-specific control information transmitted using aggregation levels that enable multiplexing for an increased number of UEs 115.

At 405, UE 115-b and base station 105-b may identify one or more control resource sets within a system bandwidth for the transmission of control resources in the system. For example, multiple UEs 115 (e.g., including UE 115-b) may operate in the system bandwidth, and, to enable power saving at the various UEs 115, they may refrain from monitoring the full system bandwidth for control information and instead monitor resources associated with the one or more control resource sets for control information. In some cases, base station 105-b and UE 115-b may optionally operate using a carrier aggregation configuration. Accordingly, at 410, base station 105-b may transmit, and UE 115-b may receive, a message that configures a set of component carriers in the carrier aggregation configuration. In such cases, the system bandwidth may include a bandwidth of a first component carrier of the carrier aggregation configuration and/or a bandwidth of a second component carrier of the carrier aggregation configuration.

At 415, base station 105-b may identify a first aggregation level associated with a first search space and a second aggregation level associated with a second search space for a given control resource set. The control resource set may be configured to carry control information that is common to UE 115-b and other UEs 115 in the wireless communications system. For example, the control resource set may include at least one of system information, paging information, a random access response message, group power control, addressing to multiple UEs 115, or any combination thereof. In some cases, the first aggregation level is associated with control information common to UE 115-b and the other UEs 115 in the wireless communications system (e.g., the first aggregation level is associated with a broadcast-based control channel). In some examples, the first aggregation level is associated with a set of aggregation levels, including aggregation level four or aggregation level eight. Additionally, the second aggregation level may be associated with a set of aggregation levels, including aggregation level one, aggregation level two, aggregation level four, aggregation level eight, or aggregation level sixteen. In some cases, multiple aggregation levels from the first set and second set of aggregation levels may be associated with the search spaces.

At 420, base station 105-b may map control information to different decoding candidates of the respective search spaces. For example, base station 105-b may map common control information to at least one first decoding candidate of the common search space in accordance with the first aggregation level. Base station 105-b may also map UE-specific control information to at least one second decoding candidate of the UE-specific search space in accordance with the second aggregation level.

At 425, base station 105-b may transmit a MIB to UE 115-b. For example, base station 105-b may transmit a PBCH that includes the MIB. In some cases, such as when UE 115-b and base station 105-b are operating in the carrier aggregation configuration, the MIB may be transmitted on resources of a given component carrier of the carrier aggregation configuration, where the MIB includes an indication of a location of the common control resource set. For example, the MIB may indicate that the given component carrier includes the common control resource set (e.g., and may indicate that another carrier in the carrier aggregation configuration includes the common control resource set). Alternatively, the MIB may indicate that the control resource set is located within the bandwidth of another component carrier.

At 430, base station 105-b may transmit, and UE 115-b may receive, control information. At 435, UE 115-b may identify the first aggregation level and the second aggregation level for the control resource set. In some cases, UE 115-b may identify two or more modulation symbols within the control resource set, where a first modulation symbol includes a common search space and a second modulation symbol includes a UE-specific search space.

At 440, UE 115-b may monitor different decoding candidates for information. For example, UE 115-b may monitor first decoding candidates of the common search space in accordance with the first aggregation level to detect common control information. Additionally, UE 115-b may monitor second decoding candidates of the UE-specific search space in accordance with the second aggregation level to detect UE-specific control information. In some examples, UE 115-b may receive a reference signal in a modulation symbol of the common control resource set, where the common control resource set includes a broadcast channel (e.g., the PBCH) punctured by the reference signal.

At 445, UE 115-b may detect control information included in the control resource set. For example, UE 115-b may detect broadcast-based control information (e.g., paging information, system information, etc.) associated with the first aggregation level, and may detect UE-specific control information (e.g., scheduling information, power control information, etc.) associated with the second aggregation level. At 450, UE 115-b and base station 105-b may communicate based on the control information.

Figure 5:
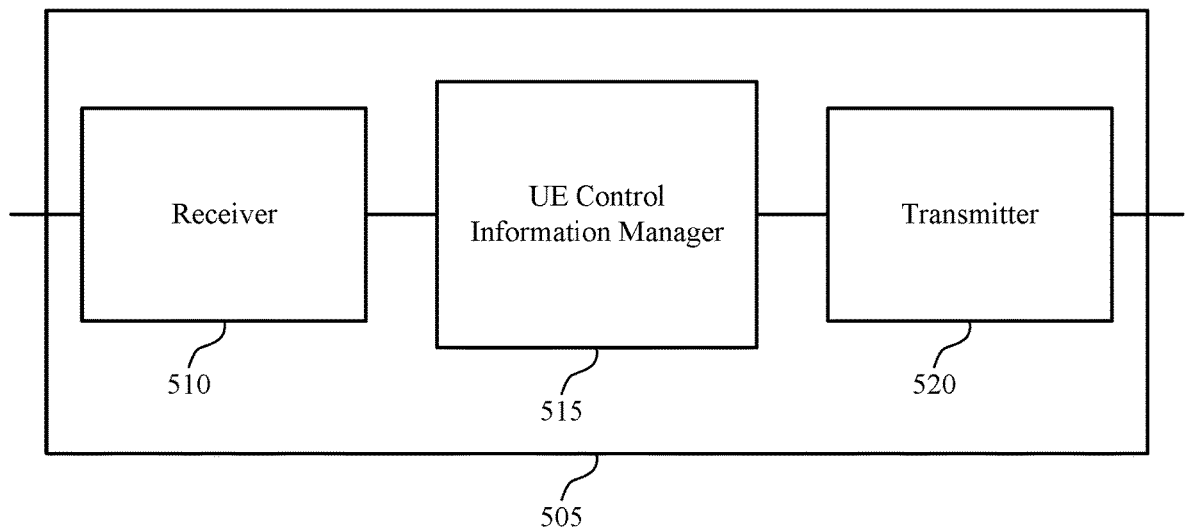
FIGS. 5 through 7 show block diagrams of a device or devices that support communications using a common control resource set with UE-specific resources in accordance with aspects of the present disclosure.

FIG. 5 shows a block diagram 500 of a wireless device 505 that supports communications using a common control resource set with UE-specific resources in accordance with various aspects of the present disclosure. Wireless device 505 may be an example of aspects of a UE 115 as described with reference to FIG. 1. Wireless device 505 may include receiver 510, UE control information manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to common control resource set design, etc.). Information may be passed on to other components of the device. The receiver 510 may be an example of aspects of the transceiver 835 described with reference to FIG. 8.

UE control information manager 515 may be an example of aspects of the UE control information manager 815 described with reference to FIG. 8. UE control information manager 515 or at least some of its various sub-components may be implemented in hardware, software executed by a processor, firmware, or any combination thereof. If implemented in software executed by a processor, the functions of the UE control information manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE control information manager 515 and/or at least some of its various sub-components may be physically located at various positions, including being distributed such that portions of functions are implemented at different physical locations by one or more physical devices. In some examples, UE control information manager 515 or at least some of its various sub-components may be a separate and distinct component in accordance with various aspects of the present disclosure. In other examples, UE control information manager 515 or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE control information manager 515 may identify one or more control resource sets in a system bandwidth. UE control information manager 515 may identify, for a control resource set in the one or more control resource sets, a first aggregation level associated with a first search space and a second aggregation level associated with a second search space. UE control information manager 515 may monitor at least one first decoding candidate of the first search space in accordance with the first aggregation level to detect common control information and monitor at least one second decoding candidate of the second search space in accordance with the second aggregation level to detect UE-specific control information. UE control information manager 515 may communicate based at least in part on the common control information, the UE-specific control information, or both.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
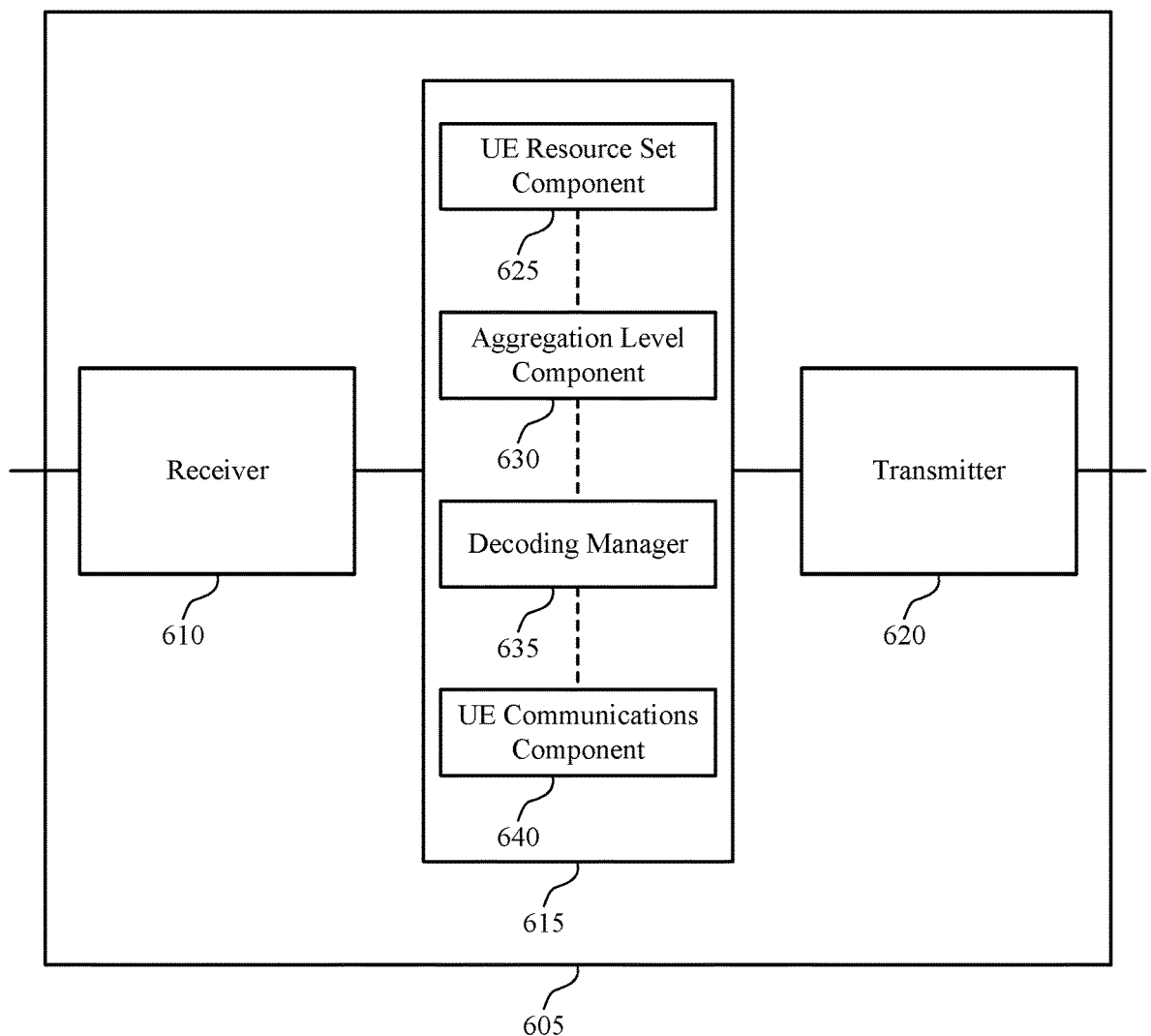

FIG. 6 shows a block diagram 600 of a wireless device 605 that supports communications using a common control resource set with UE-specific resources in accordance with various aspects of the present disclosure. Wireless device 605 may be an example of aspects of a wireless device 505 or a UE 115 as described with reference to FIGS. 1 and 5. Wireless device 605 may include receiver 610, UE control information manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to common control resource set design, etc.). Information may be passed on to other components of the device. The receiver 610 may be an example of aspects of the transceiver 835 described with reference to FIG. 8.

UE control information manager 615 may be an example of aspects of the UE control information manager 815 described with reference to FIG. 8. UE control information manager 615 may also include UE resource set component 625, aggregation level component 630, decoding manager 635, and UE communications component 640.

UE resource set component 625 may identify one or more control resource sets in a system bandwidth. Aggregation level component 630 may identify, for a control resource set in the one or more control resource sets, a first aggregation level associated with a first search space and a second aggregation level associated with a second search space. In some examples, the first aggregation level is associated with control information common to the UE 115 and the other UEs 115 in the wireless communications system. In some cases, the first aggregation level is from a first set of aggregation levels including aggregation level four or aggregation level eight. In some cases, the second aggregation level is from a first set of aggregation levels including aggregation level one, aggregation level two, aggregation level four, aggregation level eight, or aggregation level sixteen.

Decoding manager 635 may monitor at least one first decoding candidate of the first search space in accordance with the first aggregation level to detect common control information and monitor at least one second decoding candidate of the second search space in accordance with the second aggregation level to detect UE-specific control information. In some cases, the common control resource set includes at least one of system information, paging information, a random access response message, group power control, addressing to a set of UEs 115, or any combination thereof. UE communications component 640 may communicate based at least in part on the common control information, the UE-specific control information, or both.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
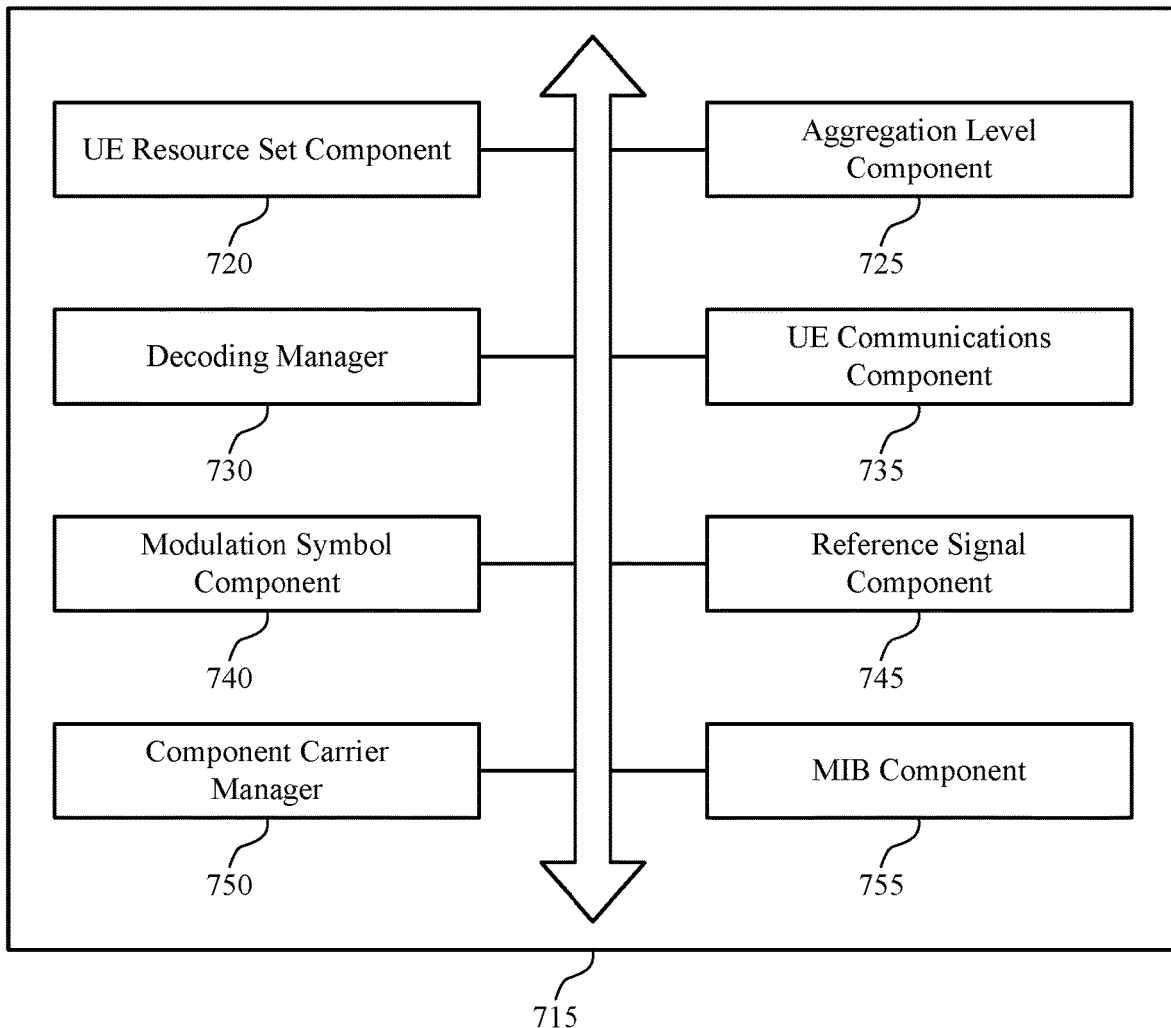

FIG. 7 shows a block diagram 700 of a UE control information manager 715 that supports communications using a common control resource set with UE-specific resources in accordance with various aspects of the present disclosure. The UE control information manager 715 may be an example of aspects of a UE control information manager 515, a UE control information manager 615, or a UE control information manager 815 described with reference to FIGS. 5, 6, and 8. The UE control information manager 715 may include UE resource set component 720, aggregation level component 725, decoding manager 730, UE communications component 735, modulation symbol component 740, reference signal component 745, component carrier manager 750, and MIB component 755. Each of these modules may communicate, directly or indirectly, with one another (e.g., via one or more buses).

UE resource set component 720 may identify one or more control resource sets in a system bandwidth. Aggregation level component 725 may identify, for a control resource set in the one or more control resource sets, a first aggregation level associated with a first search space and a second aggregation level associated with a second search space. In some examples, the first aggregation level is associated with control information common to the UE 115 and the other UEs 115 in the wireless communications system. In some cases, the first aggregation level is from a first set of aggregation levels including aggregation level four or aggregation level eight. In some cases, the second aggregation level is from a first set of aggregation levels including aggregation level one, aggregation level two, aggregation level four, aggregation level eight, or aggregation level sixteen.

Decoding manager 730 may monitor at least one first decoding candidate of the first search space in accordance with the first aggregation level to detect common control information and monitor at least one second decoding candidate of the second search space in accordance with the second aggregation level to detect UE-specific control information. In some cases, the common control resource set includes at least one of system information, paging information, a random access response message, group power control, addressing to a set of UEs 115, or any combination thereof.

UE communications component 735 may communicate based at least in part on the common control information, the UE-specific control information, or both. Modulation symbol component 740 two or more modulation symbols within the control resource set, wherein a first modulation symbol of the control resource set comprises the first search space and a second modulation symbol of the control resource set comprises the second search space.

Reference signal component 745 may receive a reference signal in a modulation symbol of the control resource set, wherein the control resource set comprises a broadcast channel punctured by the reference signal. In some cases, frequency resources associated with the first search space of the control resource set overlap at least partially with frequency resources associated with the second search space. In some such cases, reference signal component 745 may receive a reference signal in the overlapping frequency resources and detect the control information in the overlapping frequency resources based at least in part on the reference signal.

Component carrier manager 750 may receive message that configures a plurality of component carriers in a carrier aggregation configuration, wherein the system bandwidth comprises a bandwidth of a first component carrier of the carrier aggregation configuration. MIB component 755 may receive a MIB on resources of a given component carrier of the carrier aggregation configuration, where the MIB includes an indication of a location of the common control resource set. In some examples, MIB component 755 may determine that another component carrier does not include the common control resource set based on the indication in the MIB. Additionally or alternatively, MIB component 755 may identify the common control resource set within the bandwidth of another component carrier based on the indication in the MIB.

Figure 8:
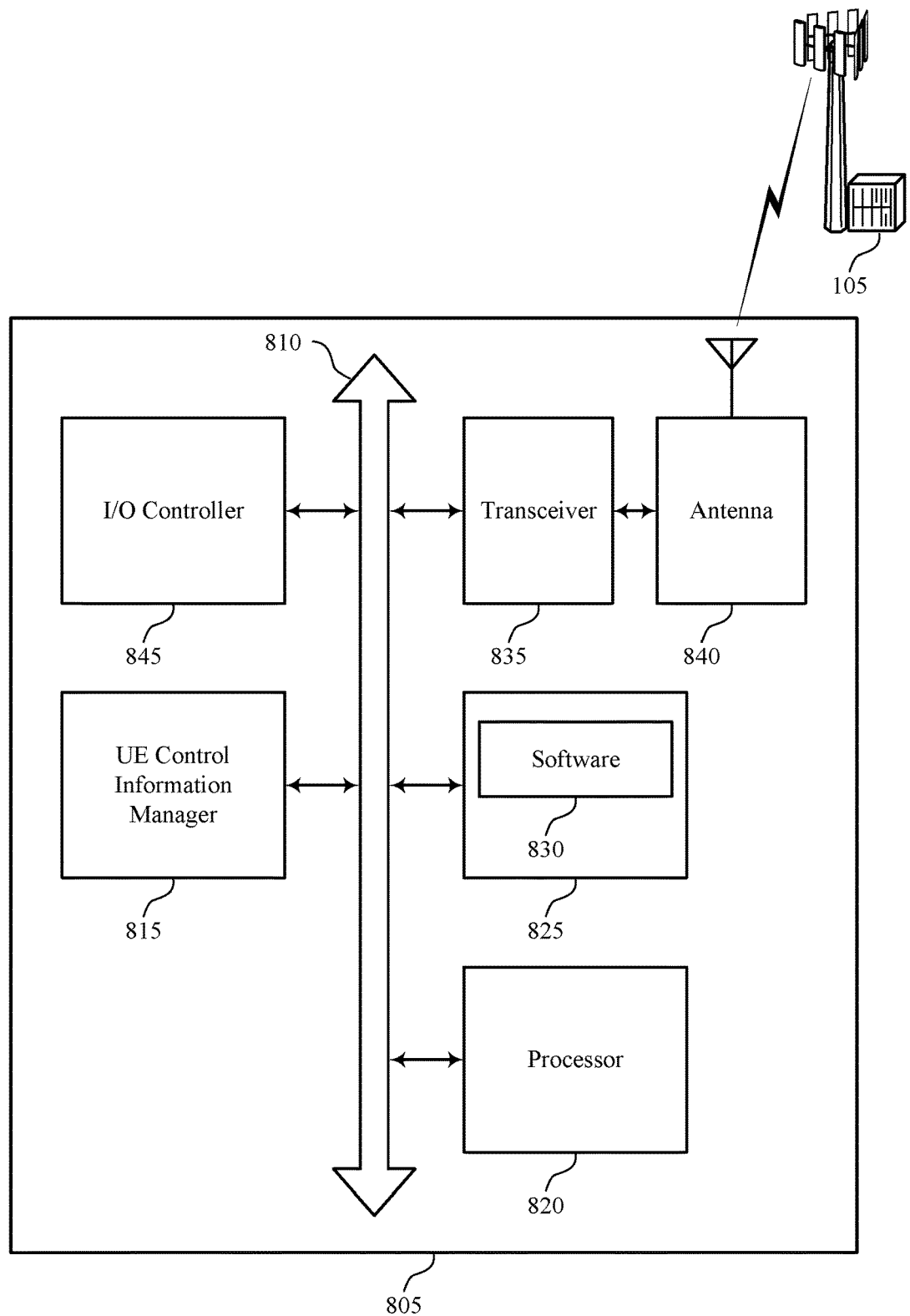
FIG. 8 illustrates a block diagram of a system, including a mobile device or UE, that supports communications using a common control resource set design in accordance with aspects of the present disclosure.

FIG. 8 shows a diagram of a system 800 including a device 805 that supports communications using a common control resource set with UE-specific resources in accordance with various aspects of the present disclosure. Device 805 may be a mobile device and may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including UE control information manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting common control resource set design).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support common control resource set design. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
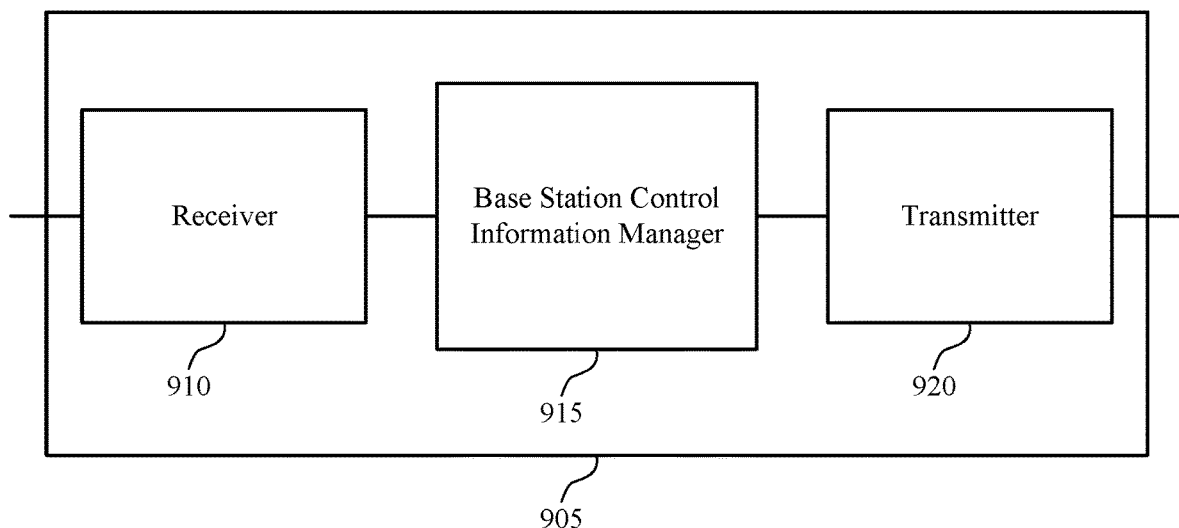
FIGS. 9 through 11 show block diagrams of a device or devices that support communications using a common control resource set design in accordance with aspects of the present disclosure.

FIG. 9 shows a block diagram 900 of a wireless device 905 that supports communications using a common control resource set with UE-specific resources in accordance with various aspects of the present disclosure. Wireless device 905 may be an example of aspects of a base station 105 as described with reference to FIG. 1. Wireless device 905 may include receiver 910, base station control information manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to common control resource set design, etc.). Information may be passed on to other components of the device. The receiver 910 may be an example of aspects of the transceiver 1235 described with reference to FIG. 12.

Base station control information manager 915 may be an example of aspects of the base station control information manager 1215 described with reference to FIG. 12. Base station control information manager 915 and/or at least some of its various sub-components may be implemented in hardware, software executed by a processor, firmware, or any combination thereof. If implemented in software executed by a processor, the functions of the base station control information manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station control information manager 915 or at least some of its various sub-components may be physically located at various positions, including being distributed such that portions of functions are implemented at different physical locations by one or more physical devices. In some examples, base station control information manager 915 or at least some of its various sub-components may be a separate and distinct component in accordance with various aspects of the present disclosure. In other examples, base station control information manager 915 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station control information manager 915 may one or more control resource sets in a system bandwidth and identify, for a control resource set in the one or more control resource sets, a first aggregation level associated with a first search space and a second aggregation level associated with a second search space. In some cases, base station control information manager 915 may map common control information to at least one first decoding candidate of the first search space in accordance with the first aggregation level and may map UE-specific control information to at least one second decoding candidate of the second search space in accordance with the second aggregation level. Base station control information manager 915 may communicate with a UE based at least in part on the common control information, the UE-specific control information, or both.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
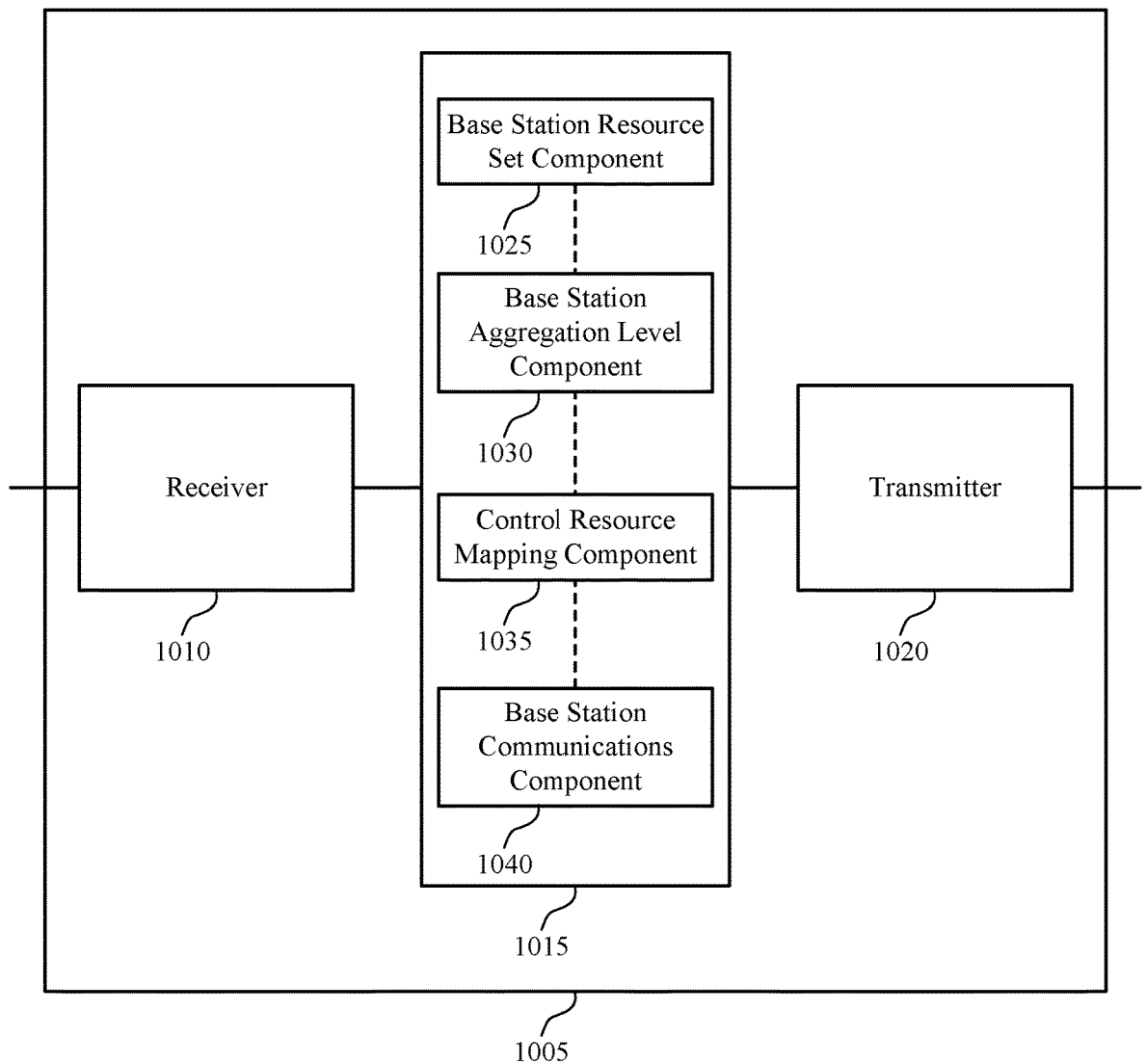

FIG. 10 shows a block diagram 1000 of a wireless device 1005 that supports communications using a common control resource set with UE-specific resources in accordance with various aspects of the present disclosure. Wireless device 1005 may be an example of aspects of a wireless device 905 or a base station 105 as described with reference to FIGS. 1 and 9. Wireless device 1005 may include receiver 1010, base station control information manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to common control resource set design, etc.). Information may be passed on to other components of the device. The receiver 1010 may be an example of aspects of the transceiver 1235 described with reference to FIG. 12.

Base station control information manager 1015 may be an example of aspects of the base station control information manager 1215 described with reference to FIG. 12. Base station control information manager 1015 may also include base station resource set component 1025, base station aggregation level component 1030, control resource mapping component 1035, and base station communications component 1040. Base station resource set component 1025 may one or more control resource sets in a system bandwidth.

Base station aggregation level component 1030 may identify, for a control resource set in the one or more control resource sets, a first aggregation level associated with a first search space and a second aggregation level associated with a second search space. In some cases, the first aggregation level is associated with control information common to the UE and other UEs operating in the system bandwidth. In some cases, the first aggregation level includes aggregation level four or aggregation level eight. In some cases, the second aggregation level includes aggregation level one, aggregation level two, aggregation level four, aggregation level eight, or aggregation level sixteen.

Control resource mapping component 1035 may map common control information to at least one first decoding candidate of the first search space in accordance with the first aggregation level and may map UE-specific control information to at least one second decoding candidate of the second search space in accordance with the second aggregation level. In some cases, the control resource set includes at least one of system information, paging information, a random access response message, group power control, addressing to a set of UEs, or any combination thereof. In some cases, frequency resources associated with the first aggregation level of the subband overlap at least partially with frequency resources associated with the second aggregation level of the subband. In some such cases, control resource mapping component 1035 may transmit a reference signal in the overlapping frequency resources and map control information in the overlapping frequency resources based at least in part on the reference signal.

Figure 11:
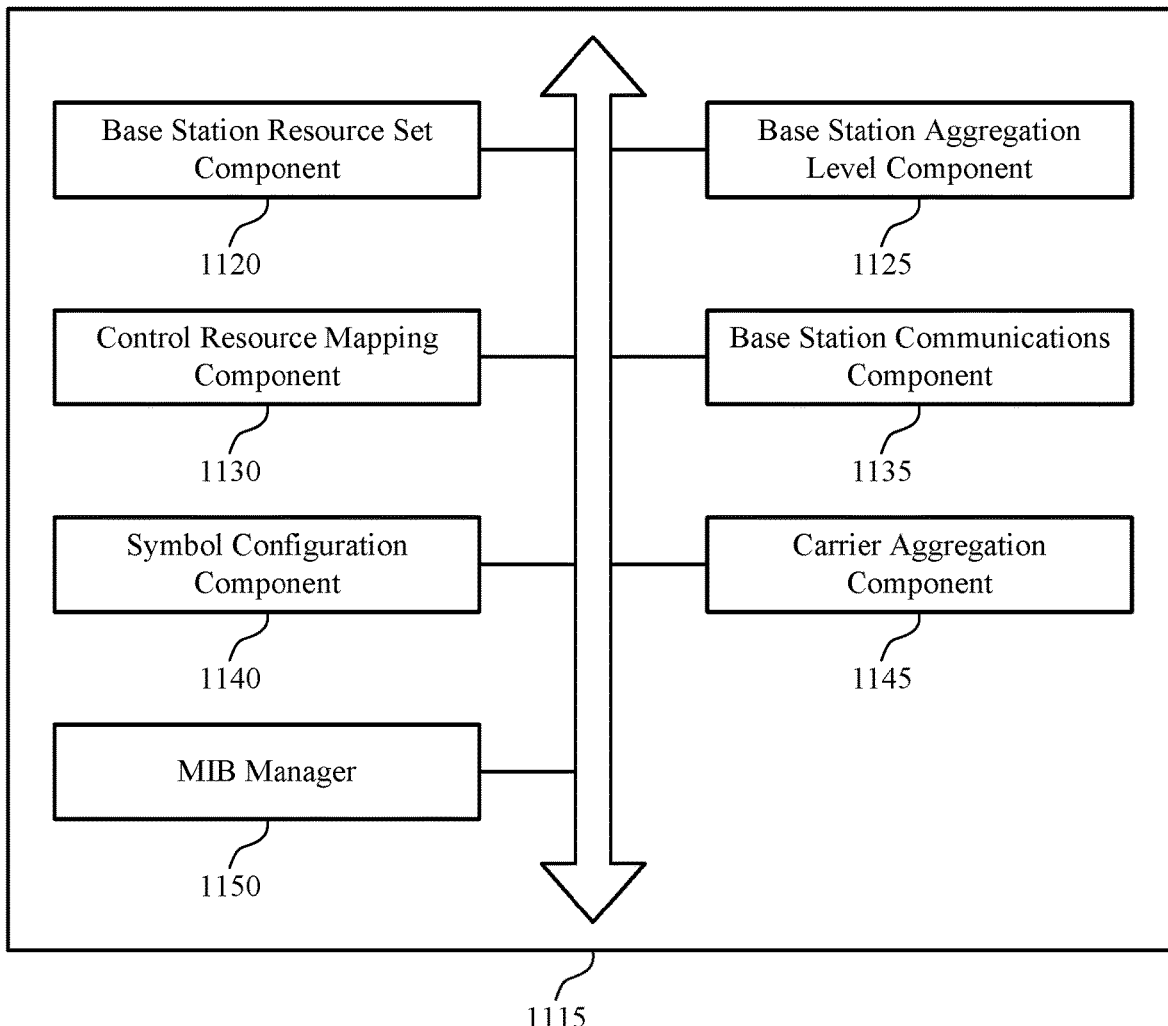

Base station communications component 1040 may communicate based on control information transmitted in the common control resource set or the UE-specific control resources, or both. Transmitter 1020 may transmit signals generated by other components of the device. In some cases, transmitter 1020 may transmit a reference signal in a modulation symbol of the common control resource set, where the common control resource set includes a broadcast channel punctured by the reference signal. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas. In some cases, FIG. 11 shows a block diagram 1100 of a base station control information manager 1115 that supports communications using a common control resource set design in accordance with various aspects of the present disclosure. The base station control information manager 1115 may be an example of aspects of a base station control information manager 1215 described with reference to FIGS. 9, 10, and 12. The base station control information manager 1115 may include base station resource set component 1120, base station aggregation level component 1125, control resource mapping component 1130, base station communications component 1135, symbol configuration component 1140, carrier aggregation component 1145, and MIB manager 1150. Each of these modules may communicate, directly or indirectly, with one another (e.g., via one or more buses).

Base station resource set component 1120 may identify a set of subbands of a system bandwidth including control resources in a wireless communications system. Base station aggregation level component 1125 may identify a first aggregation level and a second aggregation level for a subband in the set of subbands configured to carry a common control resource set that is common to a UE 115 and other UEs 115 in the wireless communications system. In some cases, the first aggregation level is associated with control information common to the UE 115 and the other UEs 115 in the wireless communications system. In some cases, the first aggregation level includes aggregation level four or aggregation level eight. In some cases, the second aggregation level includes aggregation level one, aggregation level two, aggregation level four, aggregation level eight, or aggregation level sixteen.

Control resource mapping component 1130 may map the common control resource set to first decoding candidates of the subband in accordance with the first aggregation level and map UE-specific control resources to second decoding candidates of the subband in accordance with the second aggregation level. In some cases, the control resource set includes at least one of system information, paging information, a random access response message, group power control, addressing to a set of UEs, or any combination thereof. In some cases, frequency resources associated with the first search space overlap at least partially with frequency resources associated with the second search space. In some cases, control resource mapping component 1130 may transmit a reference signal in the overlapping frequency resources and map control information in the overlapping frequency resources based at least in part on the reference signal.

Base station communications component 1135 may communicate with a UE based at least in part on the common control information, the UE-specific control information, or both. Symbol configuration component 1140 may two or more modulation symbols within the control resource set, wherein a first modulation symbol of the control resource set comprises the first search space and a second modulation symbol of the control resource set comprises the second search space.

Carrier aggregation component 1145 may transmit a message that configures a plurality of component carriers in a carrier aggregation configuration, wherein the system bandwidth comprises a bandwidth of a first component carrier of the carrier aggregation configuration. MIB manager 1150 may transmit, a MIB on resources of a given component carrier of the carrier aggregation configuration, where the MIB includes an indication of a location of the common control resource set. MIB manager 1150 may indicate in the MIB that the given component carrier includes the control resource set. In some cases, MIB manager 1150 may indicate in the MIB that the control resource set is located within the bandwidth of another component carrier.

Figure 12:
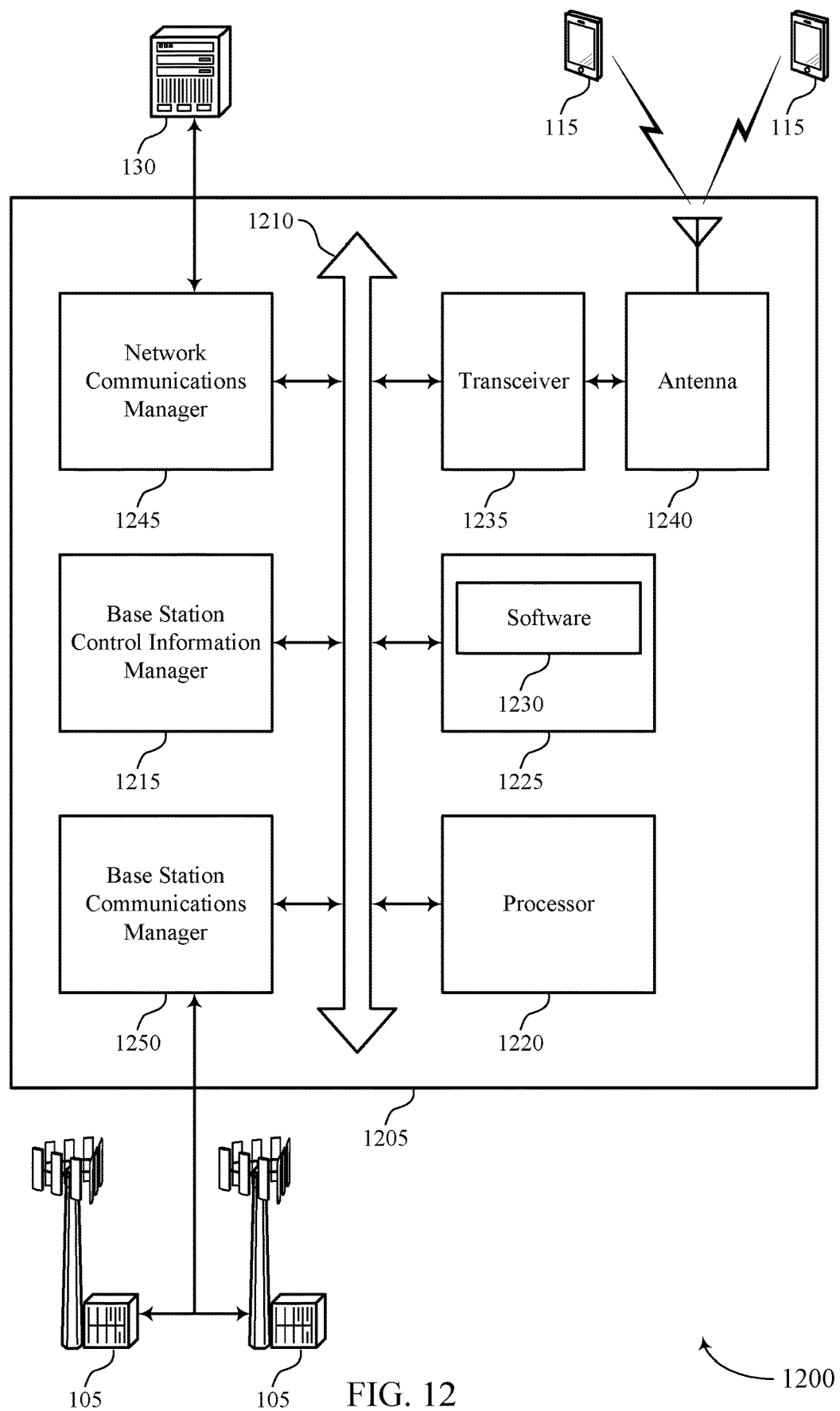
FIG. 12 illustrates a block diagram of a system, including a network device or base station, that supports communications using a common control resource set with UE-specific resources in accordance with aspects of the present disclosure.

FIG. 12 shows a diagram of a system 1200, including a device 1205, that supports communications using a common control resource set with UE-specific resources in accordance with various aspects of the present disclosure. Device 1205 may be a network device and may be an example of or include the components of base station 105 as described above, e.g., with reference to FIG. 1. Device 1205 may include components for bi-directional voice and data communications including components for transmitting and receiving communications, including base station control information manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting common control resource set design).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support common control resource set design. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
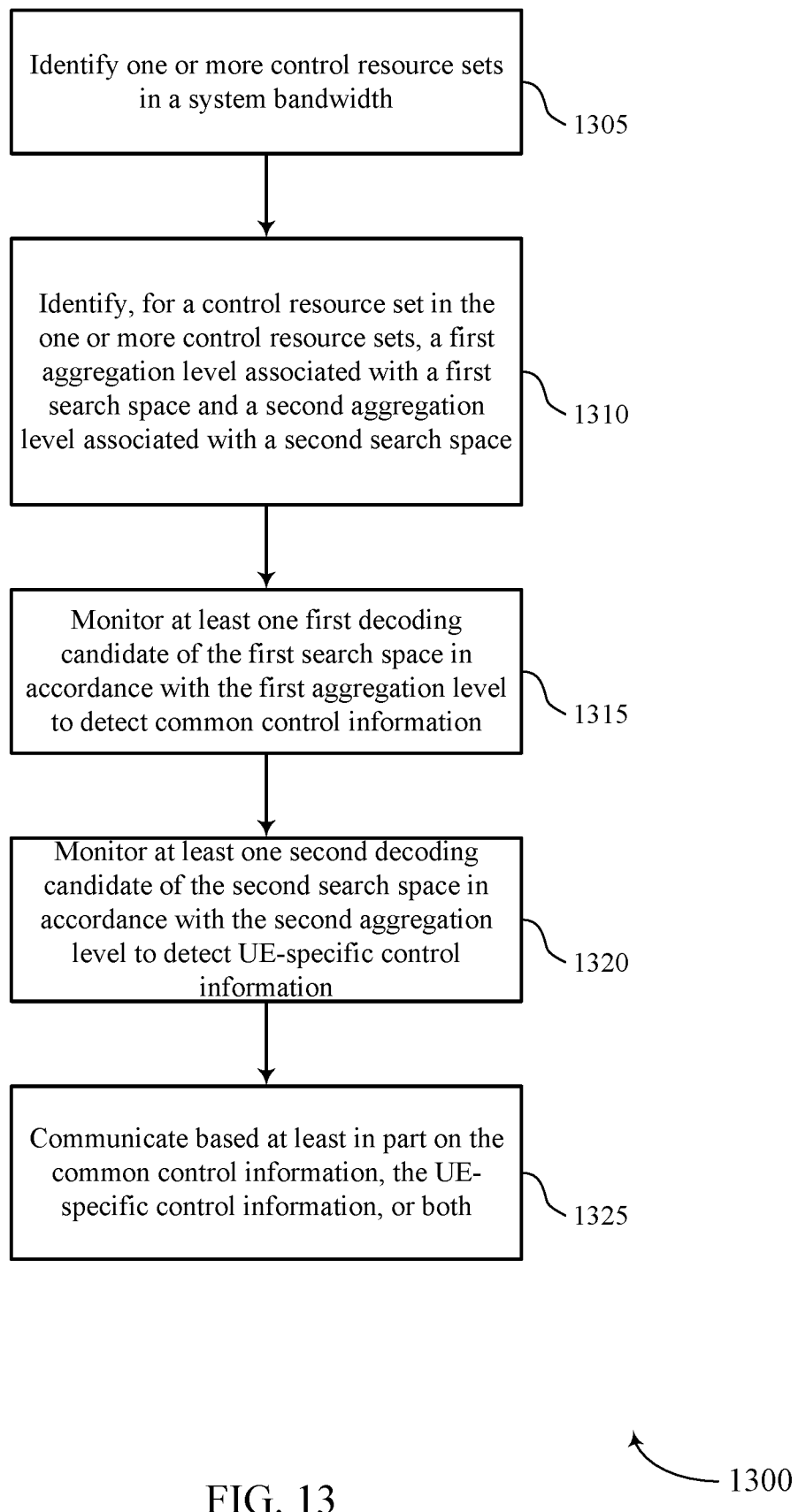
FIGS. 13 through 18 illustrate methods for communicating based on a common control resource set with UE-specific resources in accordance with aspects of the present disclosure.

FIG. 13 shows a flowchart illustrating a method 1300 for communicating based on a common control resource set design in accordance with various aspects of the present disclosure. The operations of method 1300 may be implemented by a UE 115 or its components as described herein. For example, the operations of method 1300 may be performed by a UE control information manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify one or more control resource sets in a system bandwidth. The operations of block 1305 may be performed according to the methods described with reference to FIGS. 1 through 4. In certain examples, aspects of the operations of block 1305 may be performed by a UE resource set component as described with reference to FIGS. 5 through 8.

At block 1310 the UE 115 may identify, for a control resource set in the one or more control resource sets, a first aggregation level associated with a first search space and a second aggregation level associated with a second search space. The operations of block 1310 may be performed according to the methods described with reference to FIGS.

1 through 4. In certain examples, aspects of the operations of block 1310 may be performed by a aggregation level component as described with reference to FIGS. 5 through 8.

At block 1315 the UE 115 may monitor at least one first decoding candidate of the first search space in accordance with the first aggregation level to detect common control information. The operations of block 1315 may be performed according to the methods described with reference to FIGS. 1 through 4. In certain examples, aspects of the operations of block 1315 may be performed by a decoding manager as described with reference to FIGS. 5 through 8.

At block 1320 the UE 115 may monitor at least one second decoding candidate of the second search space in accordance with the second aggregation level to detect UE-specific control information. The operations of block 1320 may be performed according to the methods described with reference to FIGS. 1 through 4. In certain examples, aspects of the operations of block 1320 may be performed by a decoding manager as described with reference to FIGS. 5 through 8.

At block 1325 the UE 115 may communicate based at least in part on the common control information, the UE-specific control information, or both. The operations of block 1325 may be performed according to the methods described with reference to FIGS. 1 through 4. In certain examples, aspects of the operations of block 1325 may be performed by a UE communications component as described with reference to FIGS. 5 through 8.

Figure 14:
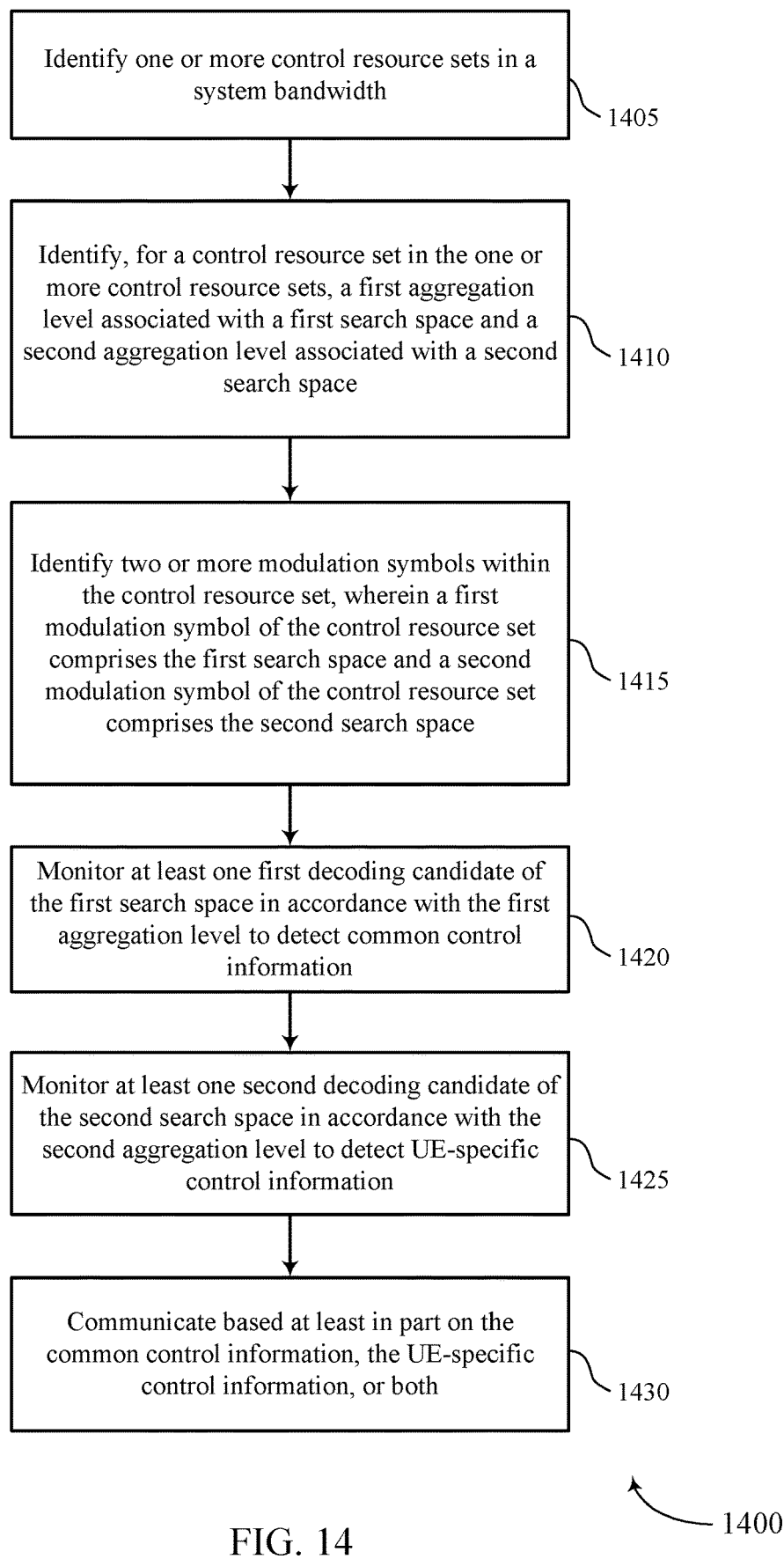

FIG. 14 shows a flowchart illustrating a method 1400 for communicating based on a common control resource set design in accordance with various aspects of the present disclosure. The operations of method 1400 may be implemented by a UE 115 or its components as described herein. For example, the operations of method 1400 may be performed by a UE control information manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify one or more control resource sets in a system bandwidth. The operations of block 1405 may be performed according to the methods described with reference to FIGS. 1 through 4. In certain examples, aspects of the operations of block 1405 may be performed by a UE resource set component as described with reference to FIGS. 5 through 8.

At block 1410 the UE 115 may identify, for a control resource set in the one or more control resource sets, a first aggregation level associated with a first search space and a second aggregation level associated with a second search space. The operations of block 1410 may be performed according to the methods described with reference to FIGS. 1 through 4. In certain examples, aspects of the operations of block 1410 may be performed by a aggregation level component as described with reference to FIGS. 5 through 8.

At block 1415 the UE 115 may identify two or more modulation symbols within the control resource set, wherein a first modulation symbol of the control resource set comprises the first search space and a second modulation symbol of the control resource set comprises the second search space. The operations of block 1415 may be performed according to the methods described with reference to FIGS. 1 through 4. In certain examples, aspects of the operations of block 1415 may be performed by a modulation symbol component as described with reference to FIGS. 5 through 8.

At block 1420 the UE 115 may monitor at least one first decoding candidate of the first search space in accordance with the first aggregation level to detect common control information. The operations of block 1420 may be performed according to the methods described with reference to FIGS. 1 through 4. In certain examples, aspects of the operations of block 1420 may be performed by a decoding manager as described with reference to FIGS. 5 through 8.

At block 1425 the UE 115 may monitor at least one second decoding candidate of the second search space in accordance with the second aggregation level to detect UE-specific control information. The operations of block 1425 may be performed according to the methods described with reference to FIGS. 1 through 4. In certain examples, aspects of the operations of block 1425 may be performed by a decoding manager as described with reference to FIGS. 5 through 8.

At block 1430 the UE 115 may communicate based at least in part on the common control information, the UE-specific control information, or both. The operations of block 1430 may be performed according to the methods described with reference to FIGS. 1 through 4. In certain examples, aspects of the operations of block 1430 may be performed by a UE communications component as described with reference to FIGS. 5 through 8.

Figure 15:
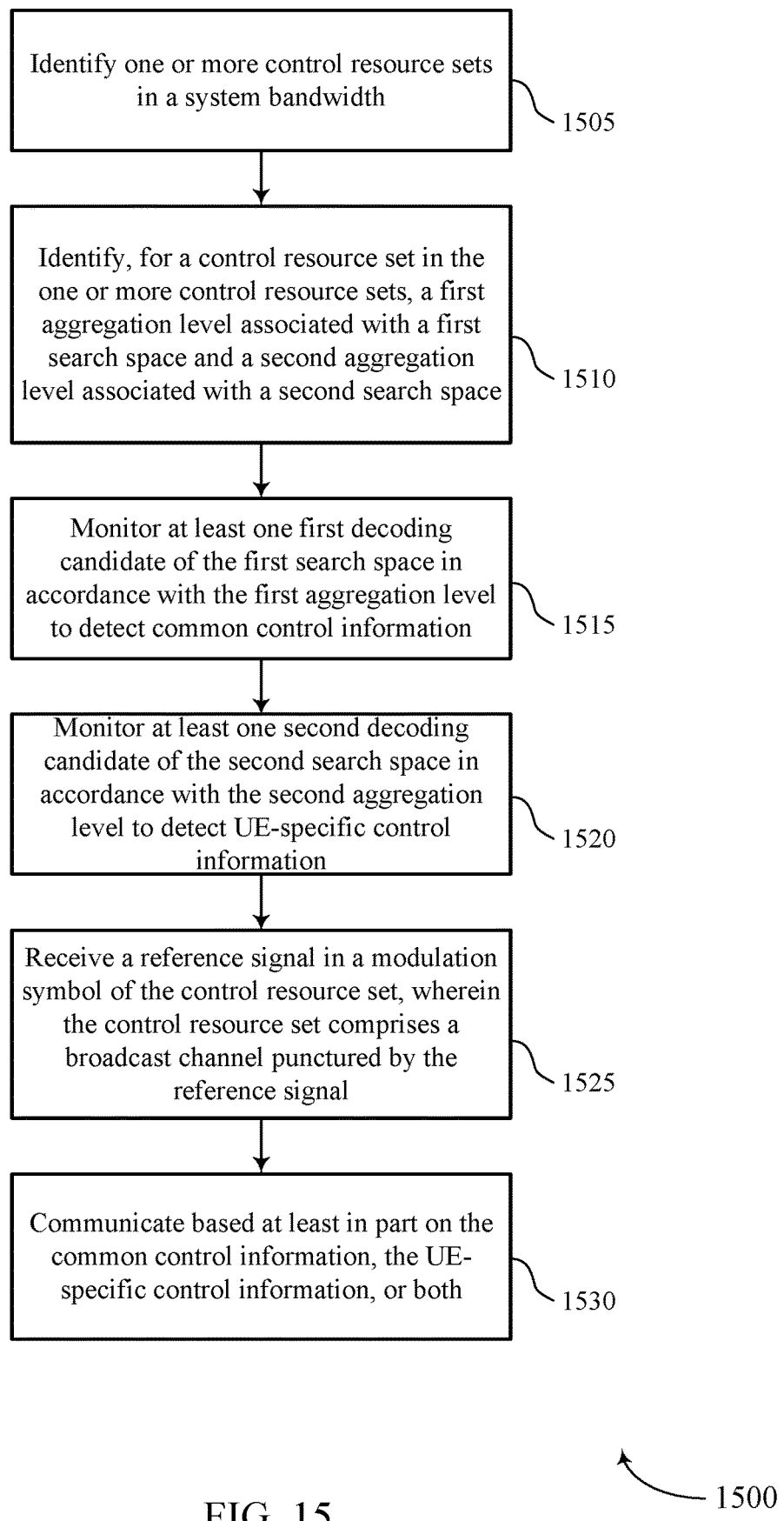

FIG. 15 shows a flowchart illustrating a method 1500 for communicating based on a common control resource set design in accordance with various aspects of the present disclosure. The operations of method 1500 may be implemented by a UE 115 or its components as described herein. For example, the operations of method 1500 may be performed by a UE control information manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify one or more control resource sets in a system bandwidth. The operations of block 1505 may be performed according to the methods described with reference to FIGS. 1 through 4. In certain examples, aspects of the operations of block 1505 may be performed by a UE resource set component as described with reference to FIGS. 5 through 8.

At block 1510 the UE 115 may identify, for a control resource set in the one or more control resource sets, a first aggregation level associated with a first search space and a second aggregation level associated with a second search space. The operations of block 1510 may be performed according to the methods described with reference to FIGS. 1 through 4. In certain examples, aspects of the operations of block 1510 may be performed by a aggregation level component as described with reference to FIGS. 5 through 8.

At block 1515 the UE 115 may monitor at least one first decoding candidate of the first search space in accordance with the first aggregation level to detect common control information. The operations of block 1515 may be performed according to the methods described with reference to FIGS. 1 through 4. In certain examples, aspects of the operations of block 1515 may be performed by a decoding manager as described with reference to FIGS. 5 through 8.

At block 1520 the UE 115 may monitor at least one second decoding candidate of the second search space in accordance with the second aggregation level to detect UE-specific control information. The operations of block 1520 may be performed according to the methods described with reference to FIGS. 1 through 4. In certain examples, aspects of the operations of block 1520 may be performed by a decoding manager as described with reference to FIGS. 5 through 8.

At block 1525 the UE 115 may receive a reference signal in a modulation symbol of the control resource set, wherein the control resource set comprises a broadcast channel punctured by the reference signal. In some cases, frequency resources associated with the first search space of the subband overlap at least partially with frequency resources associated with the second search space of the control resource set. In some cases, the UE 115 may receive a reference signal in the overlapping frequency resources and detect the control information in the overlapping frequency resources based at least in part on the reference signal. The operations of block 1525 may be performed according to the methods described with reference to FIGS. 1 through 4. In certain examples, aspects of the operations of block 1525 may be performed by a reference signal component as described with reference to FIGS. 5 through 8.

At block 1530 the UE 115 may communicate based at least in part on the common control information, the UE-specific control information, or both. The operations of block 1530 may be performed according to the methods described with reference to FIGS. 1 through 4. In certain examples, aspects of the operations of block 1530 may be performed by a UE communications component as described with reference to FIGS. 5 through 8.

Figure 16:
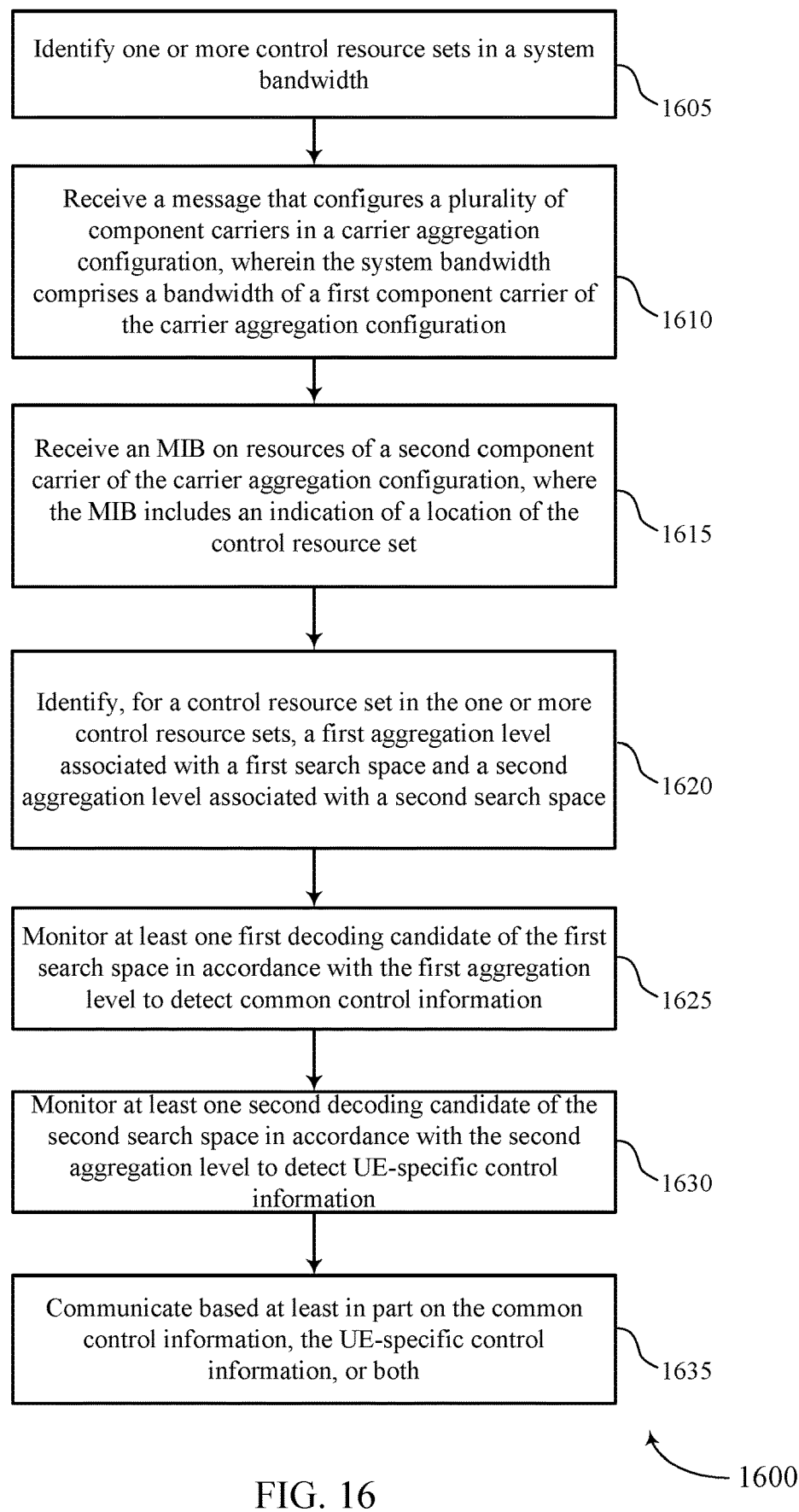

FIG. 16 shows a flowchart illustrating a method 1600 for communicating based on a common control resource set design in accordance with various aspects of the present disclosure. The operations of method 1600 may be implemented by a UE 115 or its components as described herein. For example, the operations of method 1600 may be performed by a UE control information manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify one or more control resource sets in a system bandwidth. The operations of block 1610 may be performed according to the methods described with reference to FIGS. 1 through 4. In certain examples, aspects of the operations of block 1610 may be performed by a UE resource set component as described with reference to FIGS. 5 through 8.

At block 1610 the UE 115 may receive a message that configures a plurality of component carriers in a carrier aggregation configuration, wherein the system bandwidth comprises a bandwidth of a first component carrier of the carrier aggregation configuration. The operations of block 1605 may be performed according to the methods described with reference to FIGS. 1 through 4. In certain examples, aspects of the operations of block 1605 may be performed by a component carrier manager as described with reference to FIGS. 5 through 8.

At block 1615 the UE 115 may receive a MIB on resources of a second component carrier of the carrier aggregation configuration, where the MIB comprises an indication of a location of the control resource set. The operations of block 1620 may be performed according to the methods described with reference to FIGS. 1 through 4. In certain examples, aspects of the operations of block 1620 may be performed by a MIB component as described with reference to FIGS. 5 through 8.

At block 1620 the UE 115 may identify, for a control resource set in the one or more control resource sets, a first aggregation level associated with a first search space and a second aggregation level associated with a second search space. The operations of block 1615 may be performed according to the methods described with reference to FIGS. 1 through 4. In certain examples, aspects of the operations of block 1615 may be performed by a aggregation level component as described with reference to FIGS. 5 through 8.

At block 1625 the UE 115 may monitor at least one first decoding candidate of the first search space in accordance with the first aggregation level to detect common control information. The operations of block 1625 may be performed according to the methods described with reference to FIGS. 1 through 4. In certain examples, aspects of the operations of block 1625 may be performed by a decoding manager as described with reference to FIGS. 5 through 8.

At block 1630 the UE 115 may monitor at least one second decoding candidate of the second search space in accordance with the second aggregation level to detect UE-specific control information. The operations of block 1630 may be performed according to the methods described with reference to FIGS. 1 through 4. In certain examples, aspects of the operations of block 1630 may be performed by a decoding manager as described with reference to FIGS. 5 through 8.

At block 1635 the UE 115 may communicate based at least in part on the common control information, the UE-specific control information, or both. The operations of block 1635 may be performed according to the methods described with reference to FIGS. 1 through 4. In certain examples, aspects of the operations of block 1635 may be performed by a UE communications component as described with reference to FIGS. 5 through 8.

Figure 17:
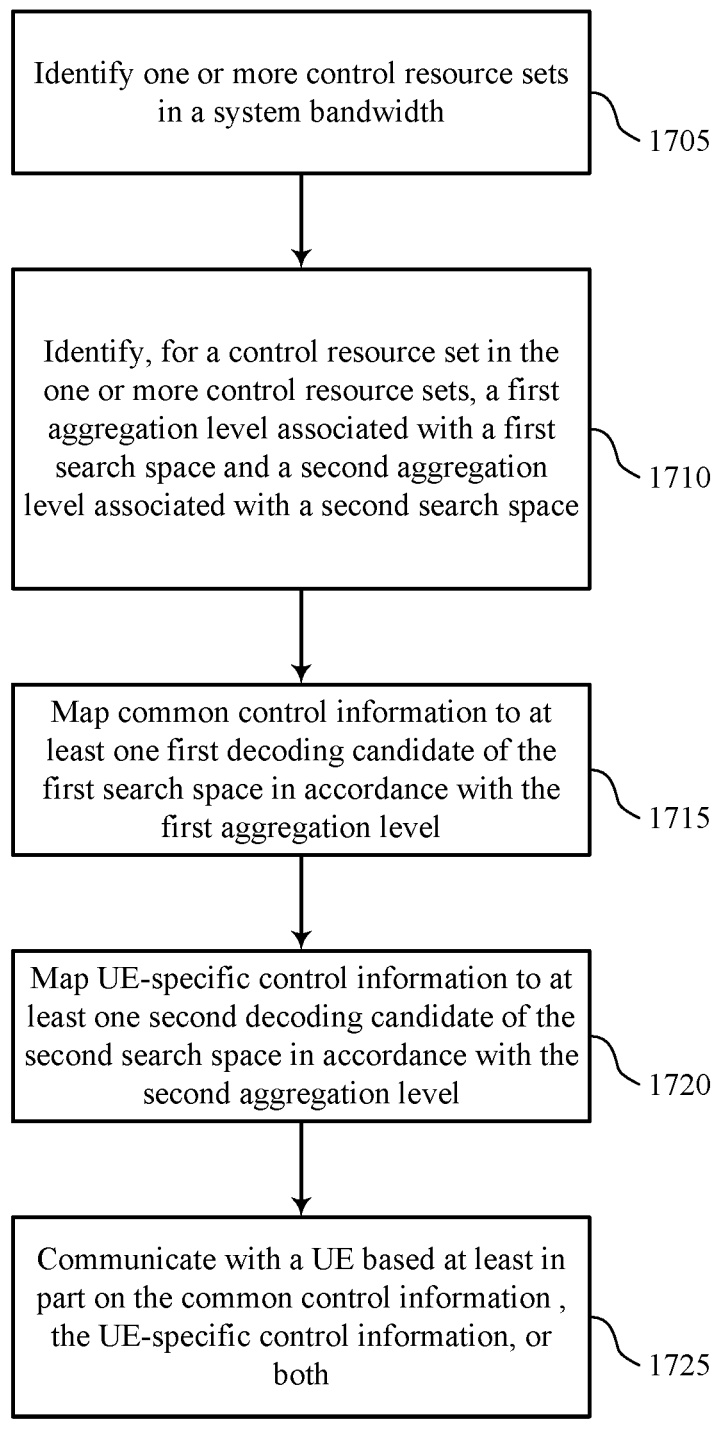

FIG. 17 shows a flowchart illustrating a method 1700 for communicating based on a common control resource set design in accordance with various aspects of the present disclosure. The operations of method 1700 may be implemented by a base station 105 or its components as described herein. For example, the operations of method 1700 may be performed by a base station control information module as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify one or more control resource sets in a system bandwidth. The operations of block 1705 may be performed according to the methods described with reference to FIGS. 1 through 4. In certain examples, aspects of the operations of block 1705 may be performed by a base station resource set component as described with reference to FIGS. 9 through 12.

At block 1710 the base station 105 may identify, for a control resource set in the one or more control resource sets, a first aggregation level associated with a first search space and a second aggregation level associated with a second search space. The operations of block 1710 may be performed according to the methods described with reference to FIGS. 1 through 4. In certain examples, aspects of the operations of block 1710 may be performed by a base station aggregation level component as described with reference to FIGS. 9 through 12.

At block 1715 the base station 105 may map common control information to at least one first decoding candidate of the first search space in accordance with the first aggregation level. The operations of block 1715 may be performed according to the methods described with reference to FIGS. 1 through 4. In certain examples, aspects of the operations of block 1715 may be performed by a control resource mapping component as described with reference to FIGS. 9 through 12.

At block 1720 the base station 105 may map UE-specific control information to at least one second decoding candidate of the second search space in accordance with the second aggregation level. The operations of block 1720 may be performed according to the methods described with reference to FIGS. 1 through 4. In certain examples, aspects of the operations of block 1720 may be performed by a control resource mapping component as described with reference to FIGS. 9 through 12.

At block 1725 the base station 105 may communicate UE-specific control information to at least one second decoding candidate of the second search space in accordance with the second aggregation level. The operations of block 1725 may be performed according to the methods described with reference to FIGS. 1 through 4. In certain examples, aspects of the operations of block 1725 may be performed by a base station communications component as described with reference to FIGS. 9 through 12.

Figure 18:
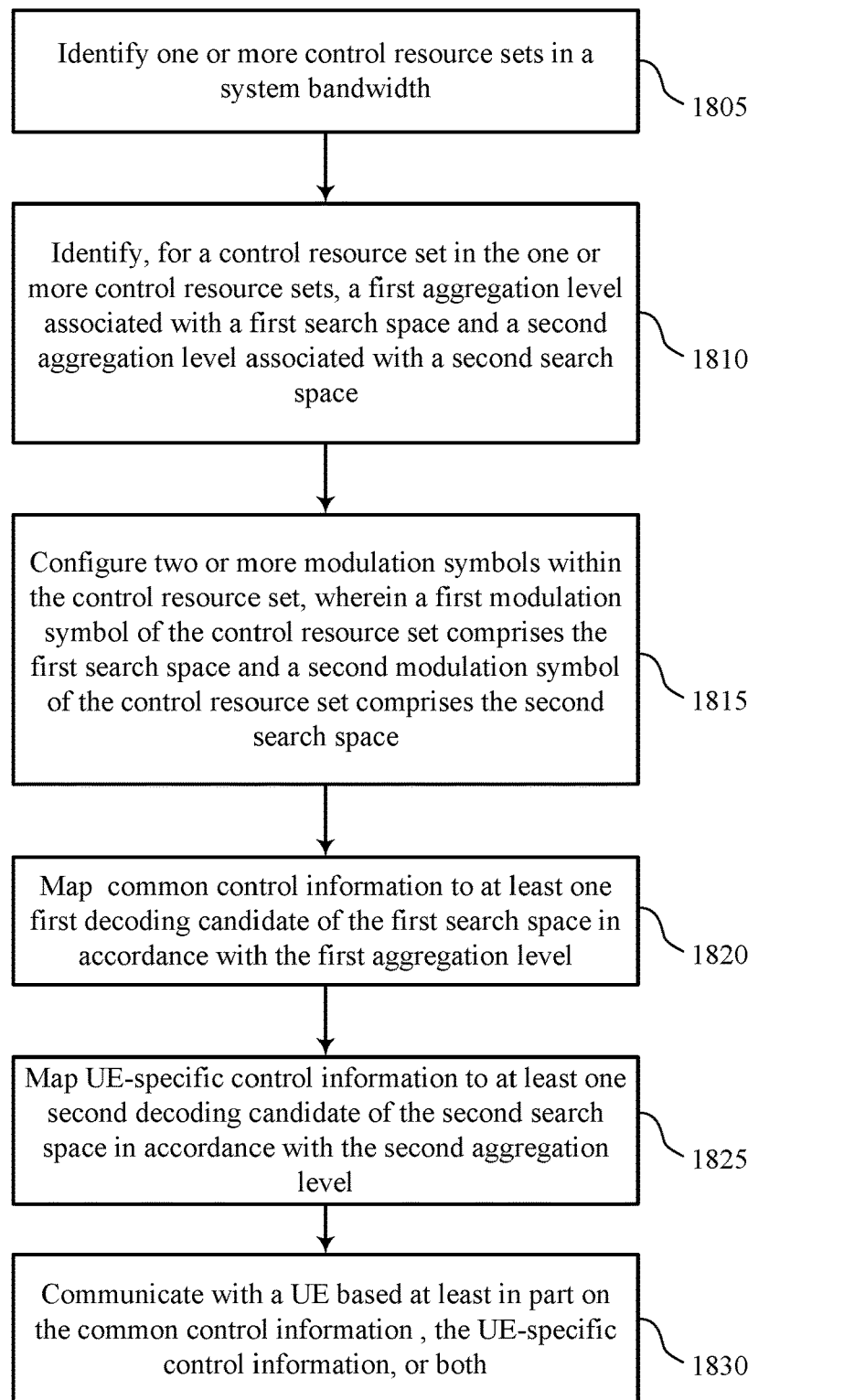

FIG. 18 shows a flowchart illustrating a method 1800 for communicating based on a common control resource set design in accordance with various aspects of the present disclosure. The operations of method 1800 may be implemented by a base station 105 or its components as described herein. For example, the operations of method 1800 may be performed by a base station control information module as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify one or more control resource sets in a system bandwidth. The operations of block 1805 may be performed according to the methods described with reference to FIGS. 1 through 4. In certain examples, aspects of the operations of block 1805 may be performed by a base station resource set component as described with reference to FIGS. 9 through 12.

At block 1810 the base station 105 may identify, for a control resource set in the one or more control resource sets, a first aggregation level associated with a first search space and a second aggregation level associated with a second search space. The operations of block 1810 may be performed according to the methods described with reference to FIGS. 1 through 4. In certain examples, aspects of the operations of block 1810 may be performed by a base station aggregation level component as described with reference to FIGS. 9 through 12.

At block 1815 the base station 105 may configure two or more modulation symbols within the control resource set, wherein a first modulation symbol of the control resource set comprises the first search space and a second modulation symbol of the control resource set comprises the second search space. For example, multiple modulation symbols may be used for the transmission of control information in the common control resource set, and the first modulation symbol may carry broadcast-based control information while the second modulation symbol may carry UE-specific control information. The operations of block 1815 may be performed according to the methods described with reference to FIGS. 1 through 4. In certain examples, aspects of the operations of block 1815 may be performed by a symbol configuration component as described with reference to FIGS. 9 through 12.

At block 1820 the base station 105 may map common control information to at least one first decoding candidate of the first search space in accordance with the first aggregation level. The operations of block 1820 may be performed according to the methods described with reference to FIGS. 1 through 4. In certain examples, aspects of the operations of block 1820 may be performed by a control resource mapping component as described with reference to FIGS. 9 through 12.

At block 1825 the base station 105 may map UE-specific control information to at least one second decoding candidate of the second search space in accordance with the second aggregation level. The operations of block 1825 may be performed according to the methods described with reference to FIGS. 1 through 4. In certain examples, aspects of the operations of block 1825 may be performed by a control resource mapping component as described with reference to FIGS. 9 through 12.

At block 1830 the base station 105 may communicate UE-specific control information to at least one second decoding candidate of the second search space in accordance with the second aggregation level. The operations of block 1830 may be performed according to the methods described with reference to FIGS. 1 through 4. In certain examples, aspects of the operations of block 1830 may be performed by a base station communications component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS).

3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:
    receiving a master information block (MIB), wherein the MIB comprises an indication of an availability of a common control resource set in one or more control resource sets in a system bandwidth, the common control resource set configured for a transmission of control information broadcast to a plurality of UEs;
    identifying a location of the common control resource set in the system bandwidth based at least in part on the indication in the received MIB;
    monitoring, based at least in part on the availability of the common control resource set, a first set of decoding candidates of a first search space associated with the common control resource set to detect common control information, wherein the common control information is associated with one or more system information block messages broadcast by a base station;
    monitoring, based at least in part on the availability of the common control resource set, a second set of decoding candidates of a second search space associated with the common control resource set to detect UE-specific control information based at least part on a cell radio network temporary identifier (C-RNTI) assigned to the UE by the base station; and
    communicating with the base station based at least in part on the common control information, the UE-specific control information, or both.

2. The method of claim 1, further comprising:
    receiving a reference signal in a modulation symbol of the common control resource set, wherein the common control resource set comprises a broadcast channel punctured by the reference signal.

3. The method of claim 1, further comprising:
    receiving a message that configures a plurality of component carriers in a carrier aggregation configuration, wherein the system bandwidth comprises a bandwidth of a first component carrier of the carrier aggregation configuration.

4. The method of claim 3, wherein:
    the system bandwidth further comprises a second component carrier of the carrier aggregation configuration;
    the MIB is received on the second component carrier; and
    the location of the common control resource set is identified in the first component carrier of the carrier aggregation configuration.

5. The method of claim 3, wherein the MIB is received on the first component carrier and indicates that none of the one or more common control resource sets is present in the first component carrier.

6. The method of claim 1, wherein the common control resource set comprises at least one of system information, paging information, a random access response message, group power control, addressing to a plurality of UEs, or any combination thereof.

7. The method of claim 1, wherein the first set of decoding candidates and the second set of decoding candidates comprise a same set of decoding candidates.

8. The method of claim 1, wherein resources of the first set of decoding candidates overlap at least partially with resources of the second set of decoding candidates.

9. A method for wireless communication performed by a base station, comprising:
    transmitting a master information block (MIB), wherein the MIB comprises an indication of an availability of a common control resource set in one or more control resource sets in a system bandwidth, the common control resource set configured for transmission of control information broadcast to a plurality of user equipments (UEs);
    mapping, based at least in part on the availability of the common control resource set, common control information to a first set of decoding candidates of a first search space associated with the common control resource set, wherein the common control information is associated with one or more system information block messages broadcast by the base station;

mapping, based at least in part on the availability of the common control resource set, user equipment (UE)-specific control information to a second set of decoding candidates of a second search space associated with the common control resource set, wherein the UE-specific control information is based at least part on a cell radio network temporary identifier (C-RNTI) assigned to a UE by the base station; and communicating with the UE based at least in part on the common control information, the UE-specific control information, or both.

10. The method of claim 9, further comprising:
transmitting a reference signal in a modulation symbol of the common control resource set, wherein the common control resource set comprises a broadcast channel punctured by the reference signal.

11. The method of claim 9, further comprising:
transmitting a message that configures a plurality of component carriers in a carrier aggregation configuration, wherein the system bandwidth comprises a bandwidth of a first component carrier of the carrier aggregation configuration.

12. The method of claim 9, wherein the common control resource set comprises at least one of system information, paging information, a random access response message, group power control, addressing to a plurality of UEs, or any combination thereof.

13. The method of claim 9, wherein the first set of decoding candidates and the second set of decoding candidates comprise a same set of decoding candidates.

14. The method of claim 9, wherein resources of the first set of decoding candidates overlap at least partially with resources of the second set of decoding candidates.

15. A mobile device for wireless communication, comprising:
a processor;
memory coupled with the processor; and
instructions stored in the memory and operable, when executed by the processor, to cause the mobile device to:
receive a master information block (MIB), wherein the MIB comprises an indication of an availability of a common control resource set in one or more control resource sets in a system bandwidth, the common control resource set configured for transmission of control information broadcast to a plurality of user equipments (UEs);
identify a location of the common control resource set in the system bandwidth based at least in part on the indication in the received MIB;
monitor, based at least in part on the availability of the common control resource set, a first set of decoding candidates of a first search space associated with the common control resource set to detect common control information, wherein the common control information is associated with one or more system information block messages broadcast by a base station;
monitor, based at least in part on the availability of the common control resource set, a second set of decoding candidates of a second search space associated with the common control resource set to detect UE-specific control information based at least part on a cell radio network temporary identifier (C-RNTI) assigned to the UE by the base station; and communicate with the base station based at least in part on the common control information, the UE-specific control information, or both.

16. The mobile device of claim 15, wherein the instructions are executable by the processor to cause the mobile device to:
receive a reference signal in a modulation symbol of the common control resource set, wherein the common control resource set comprises a broadcast channel punctured by the reference signal.

17. The mobile device of claim 15, wherein the instructions are further by the processor to cause the mobile device to:
receive a message that configures a plurality of component carriers in a carrier aggregation configuration, wherein the system bandwidth comprises a bandwidth of a first component carrier of the carrier aggregation configuration.

18. The mobile device of claim 15, wherein the common control resource set comprises at least one of system information, paging information, a random access response message, group power control, addressing to a plurality of UEs, or any combination thereof.

19. The mobile device of claim 15, wherein the first set of decoding candidates and the second set of decoding candidates comprise a same set of decoding candidates.

20. The mobile device of claim 15, wherein resources of the first set of decoding candidates overlap at least partially with resources of the second set of decoding candidates.

21. A network device for wireless communication, comprising:
a processor;
memory coupled with the processor; and
instructions stored in the memory and operable, when executed by the processor, to cause the network device to:
transmit a master information block (MIB), wherein the MIB comprises an indication of an availability of a common control resource set in one or more control resource sets in a system bandwidth, the common control resource set configured for transmission of control information broadcast to a plurality of user equipments (UEs);
map, based at least in part on the availability of the common control resource set, common control information to a first set of decoding candidates of a first search space associated with the common control resource set, wherein the common control information is associated with one or more system information block messages broadcast by the base station;
map, based at least in part on the availability of the common control resource set, user equipment (UE)-specific control information to a second set of decoding candidates of a second search space associated with the common control resource set, wherein the UE-specific control information is based at least part on a cell radio network temporary identifier (C-RNTI) assigned to a UE by the base station; and
communicate with the UE based at least in part on the common control information, the UE-specific control information, or both.

22. The network device of claim 21, wherein the instructions are executable by the processor to cause the network device to:
transmit a reference signal in a modulation symbol of the common control resource set, wherein the common control resource set comprises a broadcast channel punctured by the reference signal.

23. The network device of claim 21, wherein the instructions are executable by the processor to cause the network device to:
transmit a message that configures a plurality of component carriers in a carrier aggregation configuration, wherein the system bandwidth comprises a bandwidth of a first component carrier of the carrier aggregation configuration.

24. The network device of claim 21, wherein the common control resource set comprises at least one of system information, paging information, a random access response message, group power control, addressing to a plurality of UEs, or any combination thereof.

25. The network device of claim 21, wherein the first set of decoding candidates and the second set of decoding candidates comprise a same set of decoding candidates.

26. The network device of claim 21, wherein resources of the first set of decoding candidates overlap at least partially with resources of the second set of decoding candidates.

* * * * *